(12) United States Patent
Berman et al.

(10) Patent No.: US 11,568,543 B2
(45) Date of Patent: Jan. 31, 2023

(54) ATTENTION MASKS IN NEURAL NETWORK VIDEO PROCESSING

(71) Applicant: Western Digital Technologies, Inc., San Jose, CA (US)

(72) Inventors: David Berman, San Jose, CA (US); Toshiki Hirano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 42 days.

(21) Appl. No.: 17/197,908

(22) Filed: Mar. 10, 2021

(65) Prior Publication Data

US 2022/0292291 A1    Sep. 15, 2022

(51) Int. Cl.
| | |
|---|---|
| G06T 7/10 | (2017.01) |
| G06K 9/62 | (2022.01) |
| G06V 10/22 | (2022.01) |
| G06V 10/28 | (2022.01) |
| G06V 10/94 | (2022.01) |
| G06V 20/40 | (2022.01) |

(52) U.S. Cl.
CPC ............ *G06T 7/10* (2017.01); *G06K 9/6227* (2013.01); *G06K 9/6257* (2013.01); *G06V 10/22* (2022.01); *G06V 10/28* (2022.01); *G06V 10/95* (2022.01); *G06V 20/40* (2022.01)

(58) Field of Classification Search
CPC ...... G06T 7/10; G06K 9/6227; G06K 9/6257; G06V 10/22; G06V 10/28; G06V 10/95; G06V 20/40
See application file for complete search history.

(56) References Cited

U.S. PATENT DOCUMENTS

| | | | |
|---|---|---|---|
| 6,751,354 B2 | 6/2004 | Foote et al. | |
| 11,055,566 B1 * | 7/2021 | Pham | G06T 3/4053 |
| 2018/0341872 A1 | 11/2018 | Wang et al. | |
| 2019/0122112 A1 * | 4/2019 | Stone | G06K 9/6256 |

(Continued)

OTHER PUBLICATIONS

Ding, G. et al., "Feature mask netowrkfor person re-identification", Patent Recognition Letters, https://doi.org/10.1016/j.patrec.2019.02.015, Feb. 18, 2019.

(Continued)

*Primary Examiner* — Casey L Kretzer
(74) *Attorney, Agent, or Firm* — Ravi Mohan; Rutan & Tucker, LLP

(57) ABSTRACT

A device configured for more efficiently processing video images within a set of video image data to detect objects is described herein. The device may include a processor configured to execute a neural network such as a convolutional neural network. The device can receive video image data from a plurality of cameras, such as stationary cameras. The device can acquire a set of sample images from a stationary camera and submit them to a specialized neural network for processing to generate an attention mask. The attention mask can be generated from a variety of methods and is applied to each of the subsequently acquired images form the camera to narrow down areas where the convolutional neural network should process data. The application of attention masks to images within video image data creates masked images that can be processed to detect objects with much greater accuracy and fewer computational resources required.

19 Claims, 15 Drawing Sheets

(56) References Cited

U.S. PATENT DOCUMENTS

2019/0362183 A1* 11/2019 Thiebaut .............. G06V 40/103
2021/0383171 A1* 12/2021 Lee ......................... G06T 9/002

OTHER PUBLICATIONS

Xu, J. et al., "Attention-Aware Compositional Network for Person Re-identification", Cornell University, Computer Science, Computer Vision and Pattern Recognition, May 9, 2018.

Mondal, A. K., et al. "MaskAAE: Latent space optimization for Adversarial Auto-Encoders", in Conference on Uncertainty in Artificial intelligence, Aug. 27, 2020 pp. 689-698. PMLR.

Moiz, S., "Fast implementation of Hadamard Transform for Object Recognition and Classification Using Parallel Processor", A Thesis Presented to The Faculty of the College of Engineering and Technology Ohio University, Mar. 1991.

He, K. et al., "Mask R-CNN", Corneil University, Computer Science, Computer Vision and Pattern Recognition, Mar. 20, 2017, https://arxiv.org/abs/1703.06870.

Fukishima, K., et al. "Neocognitron: A Seif-Organizing Neural Network Model for a Mechanism of Visual Pattern Recognition", Competition and Cooperation in Neural Nets pp. 267-285, Jul. 17, 2020, https://link.springer.com/chapter/10.1007/978-3-642-46466-9_18.

Howard, A. W., et al., "MobiieNets: Efficient Convolutional Neural Networks for Mobile Vision Applications", Cornell University, Computer Science, Computer Vision and Pattern Recognition, Apr. 17, 2017, https://arxiv.org/abs/1704.04861.

Kirillov, A., et al.,, "Panoptic Segmentation", arXiv:1801.00868 [cs.CV], Jan. 3, 2018, https://arxiv.org/abs/1801.00868.

Howard, A., et al., "Searching for MobileNetVS", arXiv: 1905.02244 [cs.CV] May 6, 2019, https://openaccess.thecvf.com/content_ICCV_2019/html/Howard_Searching_for_MobileNetV3_ICCV_2019_paper.html.

Oquab, M., et al., "Learning and Transferring Mid-level Image Representations Using Convolutional Neural Networks," 2014 IEEE Conference on Computer Vision and Pattern Recognition, Columbus, OH, USA, 2014, pp. 1717-1724, doi: 10.1109/CVPR.2014.222.

Tan, M., et ai., "EfficientNet: Rethinking Model Scaling for Convolutional Neural Networks", arXiv:1905,11946, May 28, 2019, https://arxiv.org/abs/1905.11946.

Russakovsky, O., et al., "ImageNet Large Scale Visual Recognition Challenge", arXiv:1409.0575 [cs.CV], Sep. 1, 2014, https://arxiv.Org/abs/1409.0575.

Eppel, S., "Setting an attention region for convolutional neural networks using region selective features, for recognition of materials within glass vessels", arXiv: 1708.08711 [cs.CV], Aug. 29, 2017, https://arxiv.org/abs/1708.08711.

Sandler, M., et al., "MobileNetV2: Inverted Residuals and Linear Bottlenecks", The IEEE Conference on Computer Vision and Pattern Recognition (CVPR), Jan. 13, 2018, pp. 4510-4520.

Mnih, V., et al., "Recurrent Models of Visual Attention", arXiv: 406.6247 [cs.LGl, Jun. 24, 2014, https://arxiv.org/abs/1406.6247.

* cited by examiner

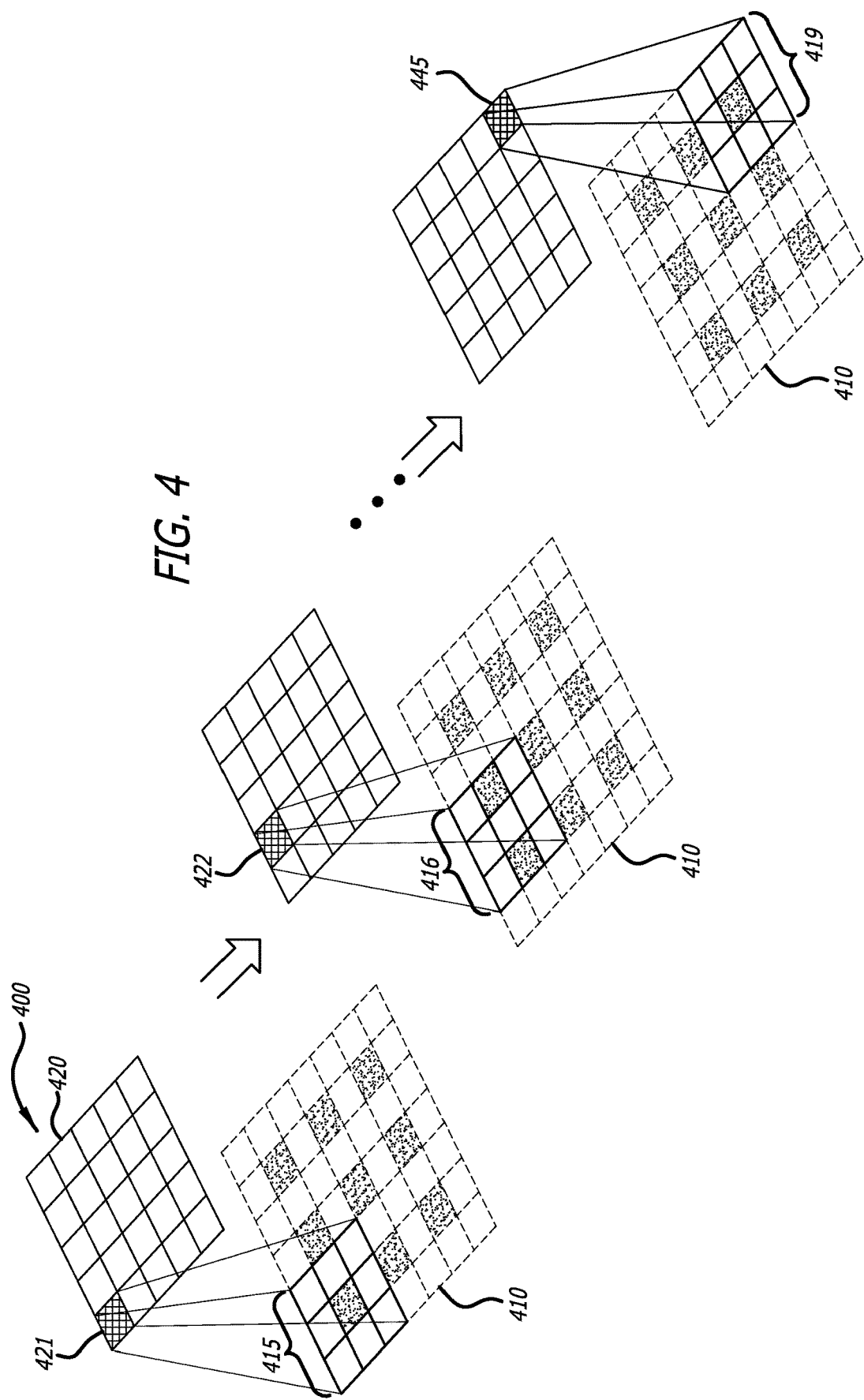

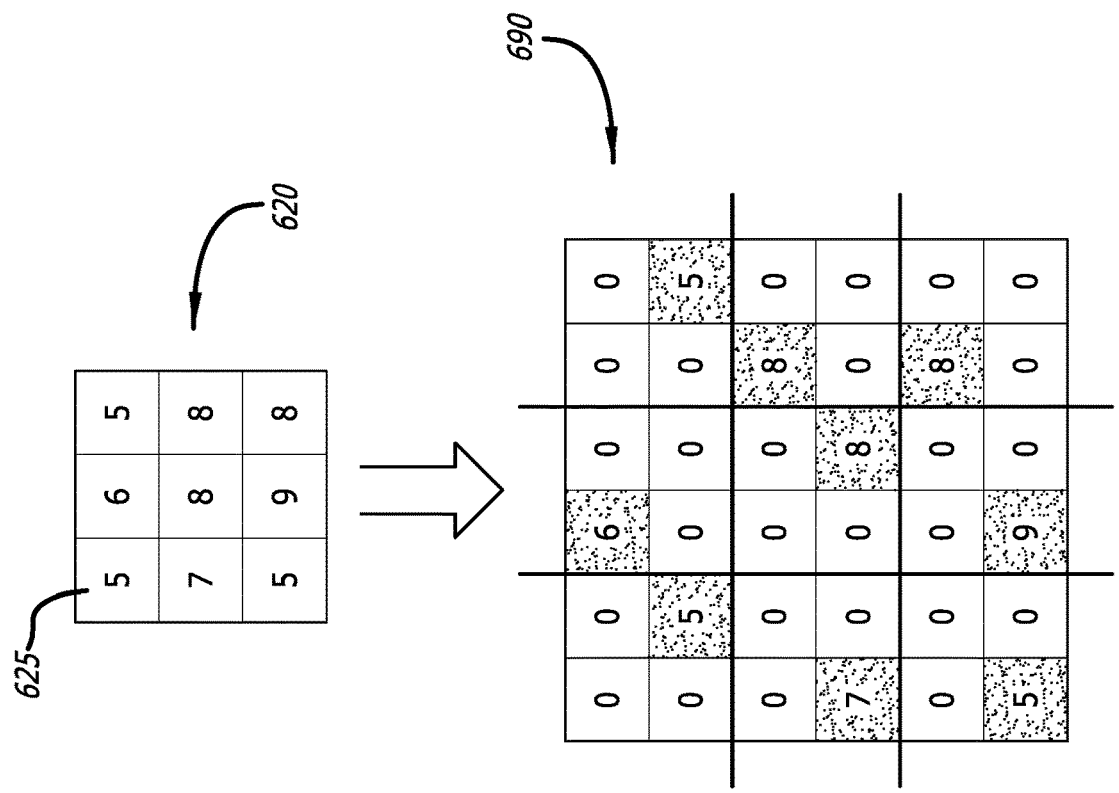
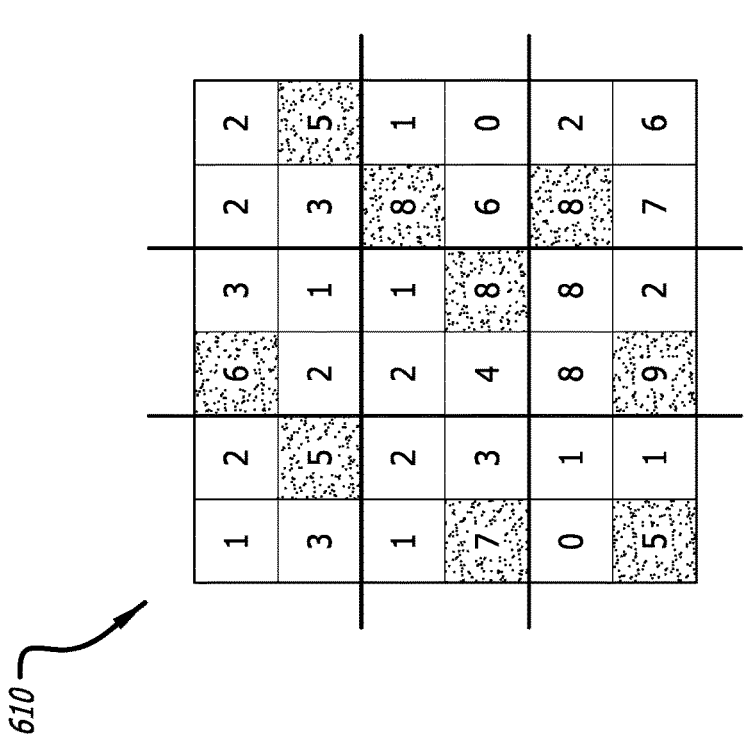
FIG. 6D

ATTENTION MASKS IN NEURAL NETWORK VIDEO PROCESSING

The present disclosure relates to neural network processing. More particularly, the present disclosure technically relates to utilizing attention masks in video data prior to processing within one or more neural networks.

BACKGROUND

As technology has grown over the last decade, the growth of time-series data such as video content has increased dramatically. This increase in time-series data has generated a greater demand for automatic classification. In response, neural networks and other artificial intelligence methods have been increasingly utilized to generate automatic classifications, specific detections, and segmentations. In the case of video processing, computer vision trends have progressively focused on object detection, image classification, and other segmentation tasks to parse semantic meaning from video content.

However, as time-series data and the neural networks used to analyze them have increased in size and complexity, a higher computational demand is created. More data to process requires more processing power to compile all of the data. Likewise, more complex neural networks require more processing power to parse the data. Traditional methods of handling these problems include trading a decrease in output accuracy for increased processing speed, or conversely, increasing the output accuracy for a decrease in processing speed. The current state of the art suggests that increasing both output accuracy and speed is achieved through providing an increase in computational power. This problem is difficult to improve upon, even on video image data that is largely static and comprises one or more regions within the image that are not relevant for processing. Even in these situations, neural networks are configured to process the entire image within the video data.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 4 is a conceptual illustration of a convolution process in accordance with an embodiment of the disclosure;

FIG. 6D is an illustrative numerical example of an upsampling process utilizing a lateral connection in accordance with an embodiment of the disclosure;

Figure 1:
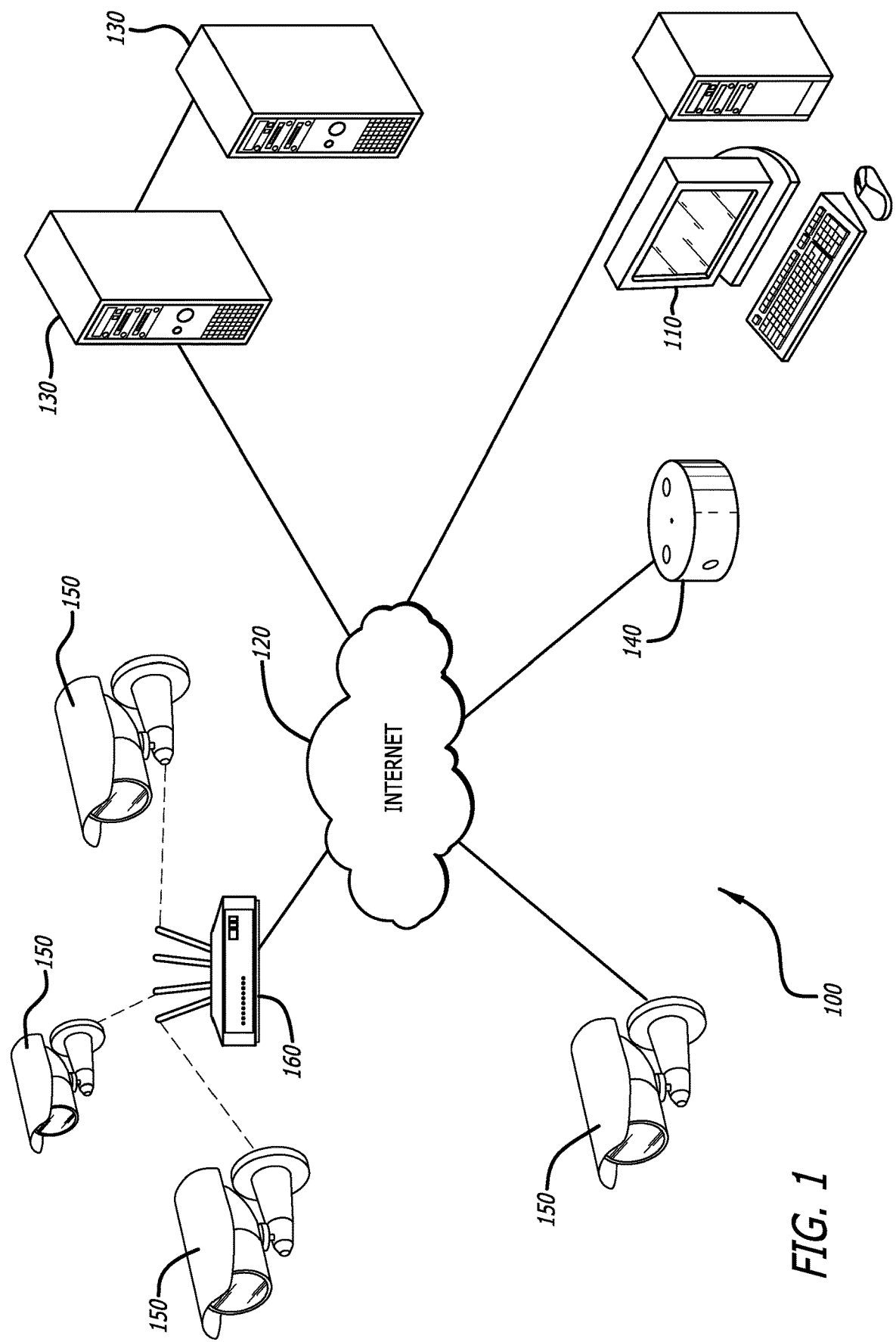
FIG. 1 is a conceptual illustration of an attention mask video image data processing system in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, systems and methods are discussed herein that describe processes for utilizing attention filters to streamline the processing of video image data within neural networks. Specifically, many embodiments of the disclosure can limit the amount of processing required on various images within video image data by "masking" off various areas that are determined to be irrelevant for the desired uses of the neural network output. As described in further detail below, the attention mask that can be applied to video image data can be configured in certain use cases to be automatically generated within the system with little to no manual input required by a system administrator and/or operator. Additionally, the use of attention masks can minimize false negative video stream classifications which may otherwise cause important events to be missed, along with avoiding false positive classifications which can lead to unnecessarily overloading the processing and monitoring system. This process of generating and applying attention masks and the various applicable use cases is disclosed herein.

Embodiments of the present disclosure can be utilized in a variety of fields including general video analytics, facial recognition, object segmentation, object recognition, autonomous driving, traffic flow detection, drone navigation/operation, stock counting, inventory control, and other automation-based tasks that generate time-series based data. The use of these embodiments can result in fewer required computational resources to produce similarly accurate results compared to a traditional convolutional or other neural network. In this way, more deployment options may become available as computational resources increase and become more readily available on smaller electronic devices.

In a number of embodiments, a device configured for utilizing attention masks in neural network video processing may include a processor configured to process and detect objects within video images by executing a neural network. The device may further include a series of video image data for processing, and a pre-generated attention mask wherein an image tensor of the video image data is pre-processed with the pre-generated attention mask to generate a masked image. The neural network can further be configured to process the series of pre-processed masked images and generate an output for the series of masked images, the output corresponding to the detection of one or more objects within the image data.

In additional embodiments, a device may include a processor configured to process video images for object detection by executing a convolutional neural network. The processor may further receive video image data comprising a series of images for processing and use a pre-generated attention mask configured to indicate when processing should occur within the series of images. The video image data can be pre-processed with the pre-generated attention mask to generate a masked image by applying the attention mask to the video image data. The neural network may be configured to process the series of pre-processed masked images within areas indicated by the attention mask which can generate an output for the pre-processed masked images corresponding to the detection of one or more pre-determined objects within the masked images.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, a field-programmable gate array ("FPGA") or other discrete components. A function may also be implemented in programmable hardware devices such as programmable array logic, programmable logic devices, or the like.

"Neural network" refers to any logic, circuitry, component, chip, die, package, module, system, sub-system, or computing system configured to perform tasks by imitating biological neural networks of people or animals. Neural network, as used herein, may also be referred to as an artificial or deep neural network (DNN). Examples of neural networks that may be used with various embodiments of the disclosed solution include, but are not limited to, convolutional neural networks, feed forward neural networks, radial basis neural network, recurrent neural networks, modular neural networks, and the like. Certain neural networks may be designed for specific tasks such as object detection and/or image classification. Examples of neural networks suitable for object detection include, but are not limited to, Region-based Convolutional Neural Network (RCNN), Faster Region-based Convolutional Neural Network (Faster R-CNN), You Only Look Once (YOLO), and the like. Examples of neural networks suitable for image classification may include, but are not limited to, Googlenet Inception, Resnet, Mobilenet, Densenet and Efficientnet.

A neural network may include both the logic, software, firmware, and/or circuitry for implementing the neural network as well as the data and metadata for operating the neural network. One or more of these components for a neural network may be embodied in one or more of a variety of repositories, including in one or more files, databases, folders, or the like. The neural network used with embodiments disclosed herein may employ one or more of a variety of learning models including, but not limited to, supervised learning, unsupervised learning, and reinforcement learning. These learning models may employ various backpropagation techniques.

Functions or other computer-based instructions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions, logics and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions, logics, and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of an attention mask video image data processing system 100 in accordance with an embodiment of the disclosure is shown. In many embodiments, it may be desired to monitor one or more visual areas by installing security cameras 150 within those areas. The security cameras 150 can generate a plurality of video image data (i.e., "video content") that can be processed. In a number of embodiments, the processing of the video image data will be configured to determine if one or more specific objects are within the monitored visual areas. In a number of embodiments, this detection may be presented as an inference map image from an object detection network which can be a segmentation or panoptic map. These maps can be utilized as a classification as to whether a specific object is present within the input data or not. These maps can be generated as an output from a neural network such as, but not limited to, a convolutional neural network (CNN). By way of example, and not limitation, video image data processing can be established to detect the presence of one or more pedestrians within the monitored visual areas.

Monitoring video content can be inefficient when done manually. Therefore, various embodiments attempt to minimize the amount of video content that needs to be manually reviewed by attempting to identify and/or determine if one or more specific objects within the video content and then trigger a notification for manual review. Often, the video image data processing system 100 will process the video image data within a centralized video processing server 110, although some embodiments may offload various processing tasks to other devices such as, but not limited to edge network devices 140. The video processing server 110 is often connected to a network 120 such as the Internet as depicted in FIG. 1. A plurality of security cameras 150 can also be attached to the network 120 such that they are communicatively coupled to the video processing server 110. Although the embodiment of FIG. 1 depicts security cameras 150, it will be understood by those skilled in the art that any video image data capture device may be utilized as required by the desired application.

The security cameras 150 can be wired directly to the network 120 or may be wirelessly connected via one or more wireless access points 160. In this way, a variety of potential deployment arrangements may be realized to properly cover the desired areas for surveillance. In theory, there is no limit to the number of deployed security cameras 150 or other video image data capture devices that may be communicatively coupled with the video processing server 110. The limitations experienced may relate to the available bandwidth of the network 120 and computational resources of the video processing server 110.

As will be described in more detail below, video image data is transferred from one or more security cameras 150 to the video processing server 110 for processing and detection of specific objects within the visually monitored areas. Various embodiments of the disclosure attempt to reduce the amount of processing required during these operations by utilizing one or more attention masks to focus image data processing only on areas that are determined to be of interest for detection. Attention masks are generated specifically for the view of each security camera 150 within the video image data processing system 100. As such, many embodiments utilize stationary (i.e., "static") cameras that do not normally move. This allows the generated attention mask to be applicable to numerous images within the video image data.

However, in a number of embodiments, the video processing server 110 may not be configured to generate attention masks for each of the video image data input feeds of the security cameras 150. In these embodiments, the video processing server 110 can request that an attention mask be generated by one or more external attention mask generation servers 130. The attention mask generation servers 130 may be configured to host specialized neural networks that can receive a set of training data associated with a static view from a security camera 150 and output an attention mask applicable to that view. The generated attention mask can then be sent back to the video processing server 110 for use during video image data processing.

In other embodiments, the attention mask generation servers 130 may simply output data that is not itself an attention mask but may be suitable for generation of an attention mask by the video processing server 110 once received. In still further embodiments, the logic and overall capability to generate attention masks may be located within the video processing server 110 itself. The attention mask may need to be regenerated each time the security cameras 150 are moved or other occlusive events occur such as, but not limited to, animal activity, weather events, seasonal events, high winds, etc.

Figure 2:
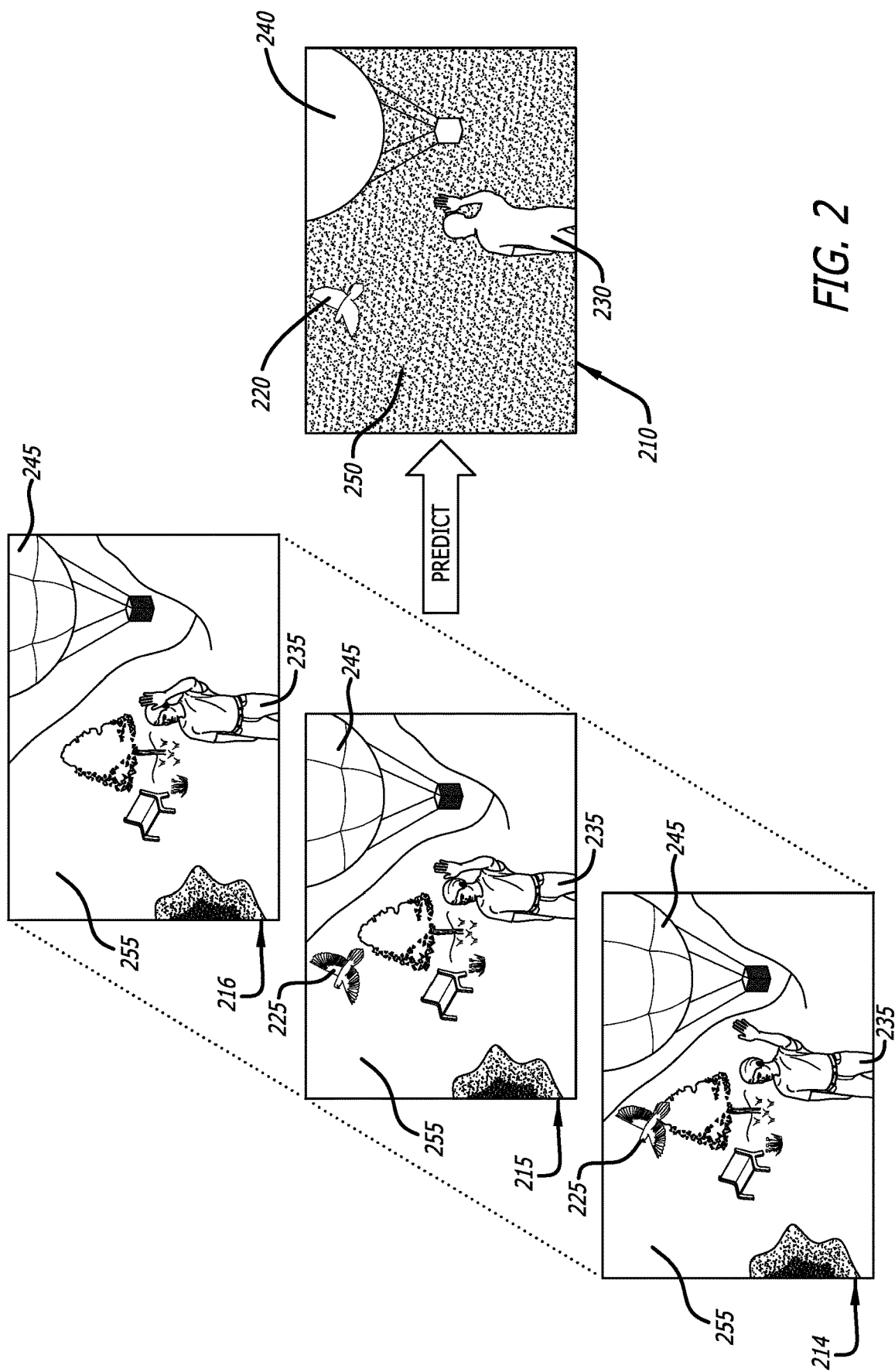
FIG. 2 is a conceptual illustration of the generation of an inference map image from multiple video still images in accordance with an embodiment of the disclosure.

Referring to FIG. 2, a conceptual illustration of the generation of an inference map image 210 from multiple video still frames 215, 216, 217 in accordance with an embodiment of the disclosure is shown. As discussed above, large portions of time-series data currently submitted for analytics processing include video content. Video content often comprises a series of still images within a container or wrapper format that describes how different elements of data and metadata coexist within a specific computer file. In many embodiments, a video file comprising video content submitted for analytics processing can be analyzed one frame at a time. However, because many video frames share similar elements with neighboring frames, the processing of each video frame can additionally examine adjacent frames to capture more information.

FIG. 2 illustrates a conceptual example of this process wherein a still frame 215 (also described herein as an image) from a video source is processed to generate an inference map image 210. The process of generating the inference map image 210 utilizes not just the main still frame 215, but also a preceding adjacent frame 214 and a successive adjacent frame 216. In certain embodiments, the preceding adjacent frame 214 and successive adjacent frame 216 can be the exact previous and next frame in series. In further embodiments, the preceding adjacent frame 214 and successive adjacent frame 216 can be keyframes within a compressed video stream. In still further embodiments, adjacent frames 214, 216 can be generated from other data within the video file.

A neural network system may be established to generate an inference map image 210 (i.e. a segmentation map) for each frame of available video within a video file which can then be further processed for various tasks such as, but not limited to, object detection, motion detection, classification, etc. One method a system may accomplish these tasks is to classify groups of pixels within an image as belonging to a similar object. By way of example and not limitation, the inference map image 210 of FIG. 2 has created grouped features 220, 230, 240 (i.e. segmentations) that correspond to a bird 225, person 235, and hot-air balloon 245 which are separate from a background 250. In various other embodiments, the inference map image 210 may be limited to detecting the presence of an object based on the desired applications.

As those skilled in the art will recognize, the input and output of neural network processing such as the video files discussed above will typically be formatted as a series of numerical representation of individual pixels that are translated into binary for storage and processing. The images within FIG. 2 are for conceptual understanding purposes and are not to be limiting to the actual inputs and outputs utilized within the current disclosure.

Figure 3:
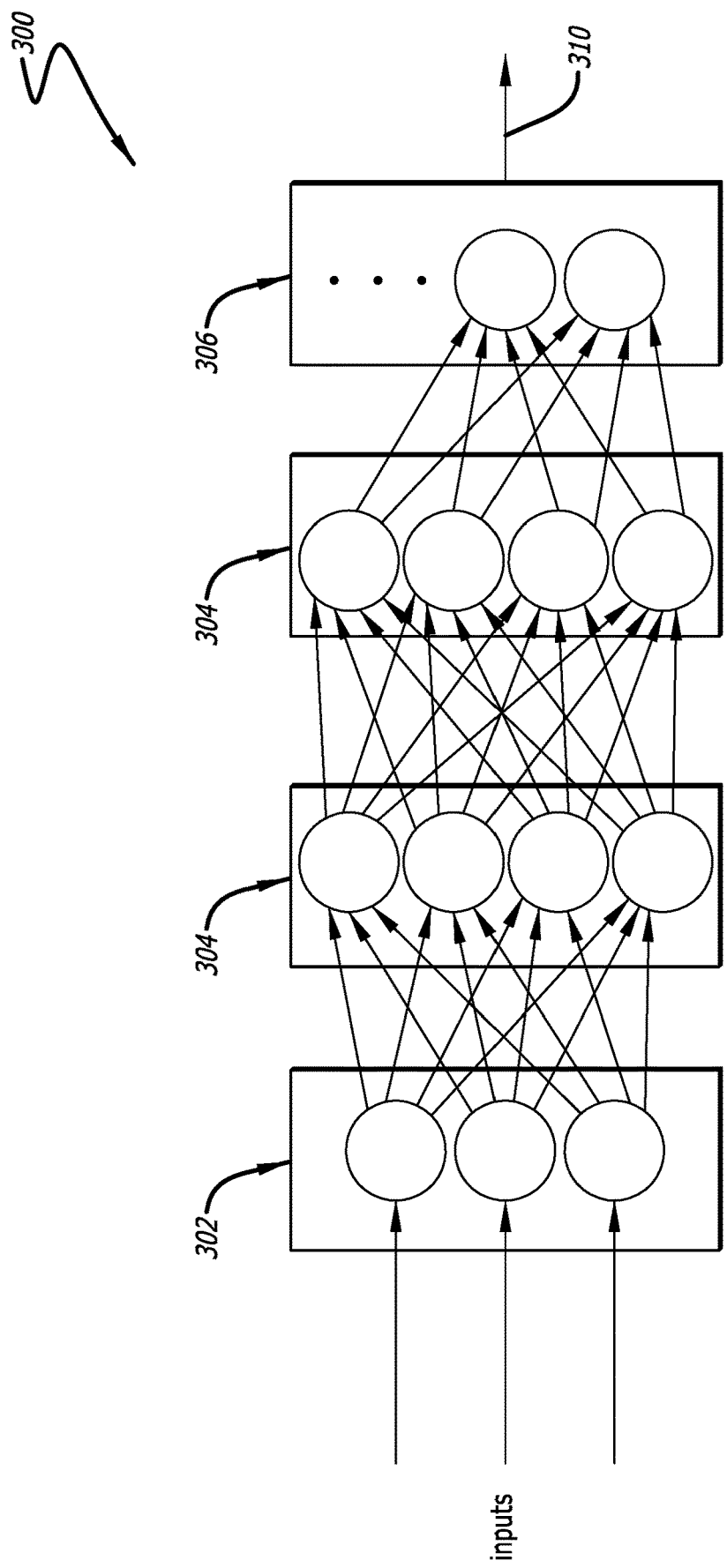
FIG. 3 is a conceptual illustration of a neural network in accordance with an embodiment of the disclosure.

Referring to FIG. 3, is a conceptual illustration of a neural network in accordance with an embodiment of the disclosure is shown. At a high level, the neural network 300 comprises an input layer 302, one or more hidden layers 304, and an output layer 306. The neural network 300 comprises a collection of connected units or nodes called artificial neurons which loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. As those skilled in the art will recognize, the neural network depicted in FIG. 3 is shown as an illustrative example and various embodiments may comprise neural networks that can accept more than one type input and can provide more than one type of output.

In a typical embodiment, the signal at a connection between artificial neurons is a real number, and the output of each artificial neuron is computed by some non-linear function (called an activation function) of the sum of the artificial neuron's inputs. The connections between artificial neurons are called "edges" or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 302), to the last layer (the output layer 306), possibly after traversing one or more intermediate layers, called hidden layers 304.

The inputs to a neural network may vary depending on the problem being addressed. In object detection, the inputs may be data representing pixel values for certain pixels within an image or frame. In one embodiment the neural network 300 comprises a series of hidden layers in which each neuron is fully connected to neurons of the next layer. The neural network 300 may utilize an activation function such as sigmoid, nonlinear, or a rectified linear unit (ReLU), upon the sum of the weighted inputs for example. The last layer in the neural network may implement a regression function such as SoftMax regression to produce the classified or predicted classifications output for object detection as output 310. In further embodiments a sigmoid function can be used and position prediction may need raw output transformation into linear and/or non-linear coordinates.

In certain embodiments, the neural network 300 is trained prior to deployment and to conserve operational resources. However, some embodiments may utilize ongoing training of the neural network 300 especially when operational resource constraints such as die area and performance are less critical. As will be discussed in more detail below, the neural networks in many embodiments will process video frames through a series of downsamplings (e.g. convolutions, pooling, etc.) and upsamplings (i.e. expansions) to generate an inference map similar to the inference map image 210 depicted in FIG. 2. Additionally, specialized neural networks can be deployed within the systems described herein that can be configured to generate attention masks for filtering video image data prior to processing by the primary processing neural network.

Referring to FIG. 4, a conceptual illustration of a convolution process 400 in accordance with an embodiment of the disclosure is shown. In a number of neural networks, input data is processed through one or more convolution layers. Convolution is a process of adding each element of an image to its local neighbors, weighted by a kernel. Often, this type of linear operation is utilized within the neural network but may be accomplished via a traditional matrix multiplication process. As an illustrative example, FIG. 4 depicts a simplified convolution process 400 on an array of pixels within a still image 410 to generate a feature map 420.

The still image 410 depicted in FIG. 4 is comprised of forty-nine pixels in a seven by seven array. As those skilled in the art will recognize, any image size may be processed in this manner and the size and number of channels depicted in this figure is minimized to better convey the overall process utilized. In the first step within the process 400, a first portion 415 of the still image 410 is processed. The first portion 415 comprises a three by three array of pixels. This first portion is processed through a filter to generate an output pixel 421 within the feature map 420. A filter can be understood to be another array, matrix, or mathematical operation that can be processed on the portion being processed. Typically, the filter can be presented as a matrix similar to the portion being processed and generates the output feature map portion via matrix multiplication or similar operation. In some embodiments, a filter may be a heuristic rule that applies to the portion being processed. An example of such a mathematical process is shown in more detail within the discussion of FIG. 5B.

In various embodiments, the process 400 may be applied to a multi-channel image. For example, a color image may have three channels of color that need to be processed. A filter may be applied to each color channel for processing of the image. In various embodiments, the output of the filter process may then be summed together to create a single summed output. For example, each pixel output of the filter can be the result of processing the summed inputs of each of the available color channels of the input image and/or feature map. Examples shown herein with respect to FIGS. 4-6D can represent a depthwise separable convolution process but may often be processed as a multi-channel to single-channel transformation upon a color image.

Once the first portion 415 of the still image 410 has been processed by the filter to produce an output pixel 421 within the feature map 420, the process 400 can move to the next step which analyzes a second (or next) portion 416 of the still image 410. This second portion 416 is again processed through a filter to generate a second output pixel 422 within the feature map. This method is similar to the method utilized to generate the first output pixel 421. The process 400 continues in a similar fashion until the last portion 419 of the still image 410 is processed by the filter to generate a last output pixel 445. Although output pixels 421, 422, 445 are described as pixels similar to pixels in a still image being processed such as still image 410, it should be understood that the output pixels 421, 422, 445 as well as the pixels within the still image 410 are all numerical values stored within some data structure and are only depicted within FIG. 4 to convey a visual understanding of how the data is processed.

In fact, as those skilled in the art will understand, video still images often have multiple channels which correspond to various base colors (red, green, blue, etc.) and can even have additional channels (i.e., layers, dimensions, etc.). In these cases, the convolution process 400 can be repeated for each channel within a still image 410 to create multiple feature maps 420 for each available channel. As discussed below, attention masks can be utilized to limit processing to specific positional locations within the video image data. Because this masking is limited to positional information, processing of color or other channels is often unaffected by the application of an attention mask. In various embodiments, the filter within the neural network that processes the still image 410 may also be dimensionally matched with the video input such that all channels are processed at once through a matching multi-dimensional filter that produces a single output pixel 421, 422, 445 like those depicted in FIG. 4, but may also produce a multi-dimensional feature map. In additional embodiments, convolution methods such as depthwise separable convolutions may be utilized when multiple channels are to be processed.

Figure 5A:
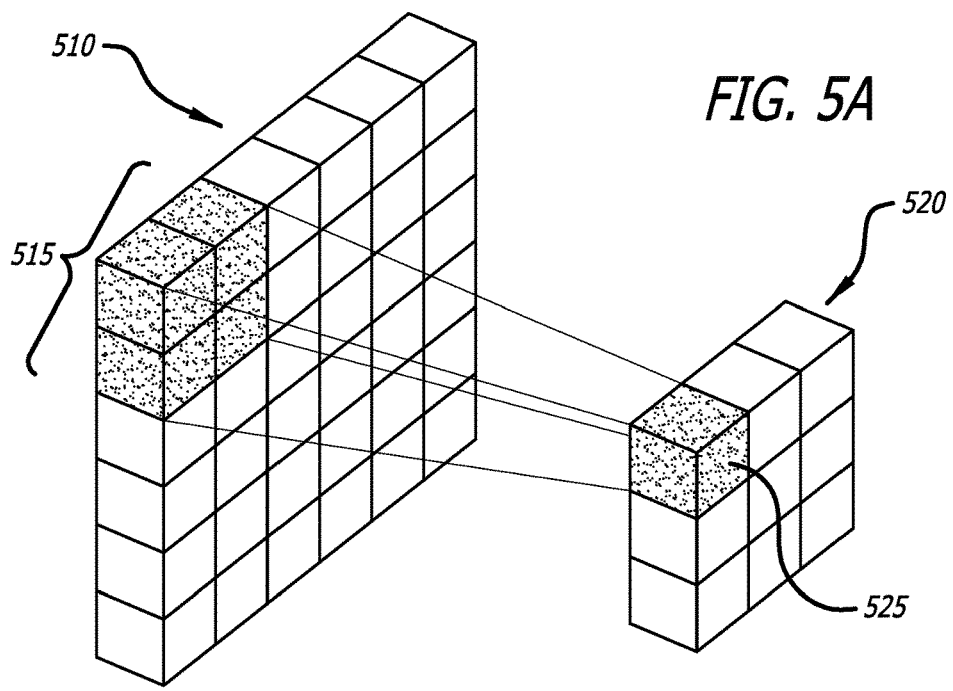
FIG. 5A is an illustrative visual example of a convolution process in accordance with an embodiment of the disclosure.

Referring to FIG. 5A, an illustrative visual example of a convolution process in accordance with an embodiment of the disclosure is shown. As discussed above, the convolution process can take an input set of data, process that data through a filter, and generate an output that can be smaller than the input data. In various embodiments, padding may be added during the processing to generate output that is similar or larger than the input data. An example visual representation of a data block 510 highlights this processing of data from a first form to a second form. Broadly, the data block 510 comprises a first portion 515 which is processed through a filter to generate a first output feature map data block 525 within the output feature map 520. The original data block 510 is shown as a six by six block while the output feature map 520 is shown as a three by three block.

Figure 5B:
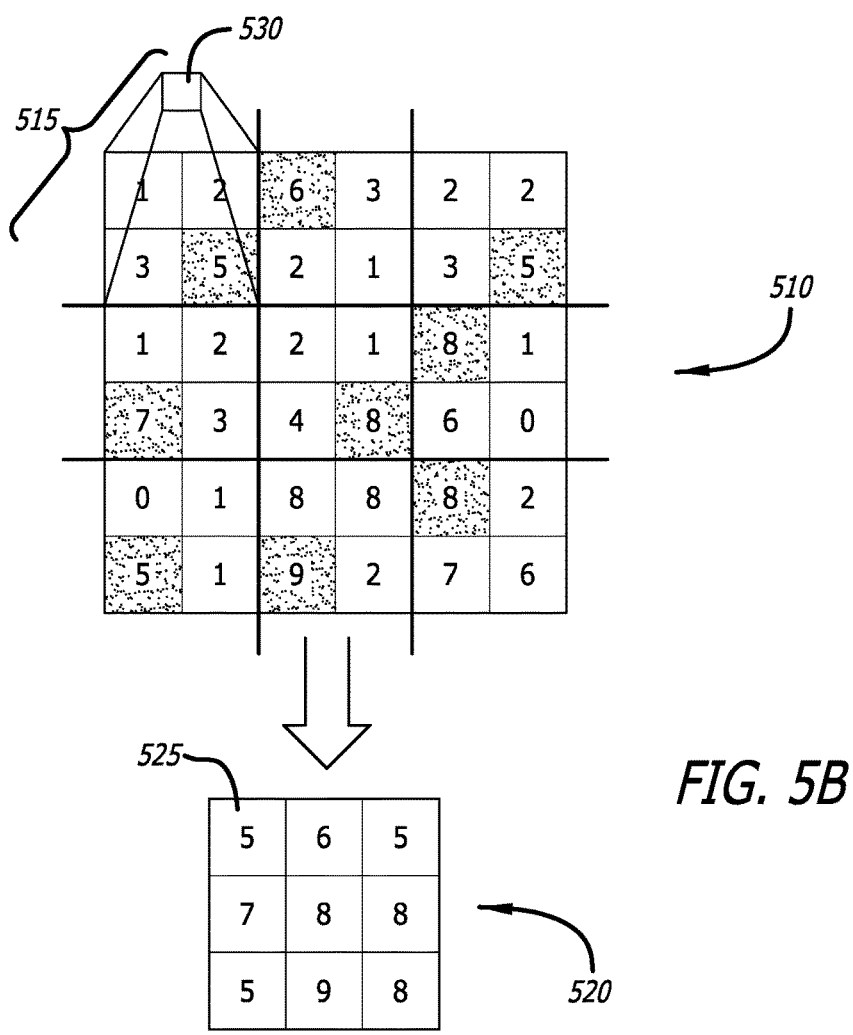
FIG. 5B is an illustrative numerical example of a convolution process in accordance with an embodiment of the disclosure.

Referring to FIG. 5B, an illustrative numerical example of a convolution process in accordance with an embodiment of the disclosure is shown. The same example data block 510 is shown numerically processed into an output feature map 520. The first portion 515 is a two by two numerical matrix in the upper left corner of the data block 510. The convolution process examines those first portion 515 matrix values through a filter 530. The filter in the example depicted in FIG. 5B applies a heuristic rule to output the maximum value within the processed portion. Therefore, the first portion 515 results in a feature map data block 525 value of five. As can be seen in FIG. 5B, the remaining two by two sub-matrices within the data block 510 comprise at least one highlighted value that corresponds to the maximum value within that matrix and is thus the resultant feature map block output within the output feature map 520.

It is noted that the convolution process within FIG. 5B was applied every two data blocks (or sub-matrix) whereas the convolution process 400 within FIG. 4 progressed pixel by pixel. This highlights that convolution processes can progress at various units, within various dimensions, and with various sizes. The convolution processes depicted within FIGS. 4, 5A and 5B are meant to be illustrative and not limiting. Indeed, as input data becomes larger and more complex, the filters applied to the input data can also become more complex to create output feature maps that can indicate various aspects of the input data. These aspects can include, but are not limited to, straight lines, edges, curves, color changes, etc. As will be described in more detail within the discussion of FIG. 7, output feature maps can themselves be processed through additional convolution process with further filters to generate more indications of useful aspects, features, and data. In a number of embodiments, after one or more downsampling processes have occurred, there may be an expansion or upsampling of the data to generate more useful information. The upsampling process is described in more detail below.

Figure 6A:
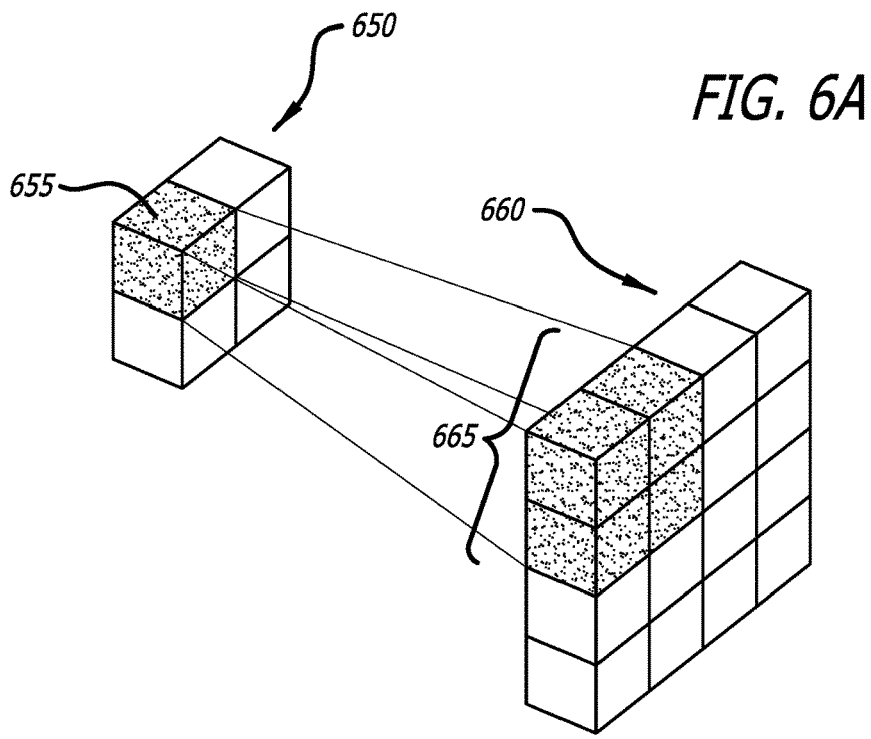
FIG. 6A is an illustrative visual example of an upsampling process in accordance with an embodiment of the disclosure.

Referring to FIG. 6A, an illustrative visual example of an upsampling process in accordance with an embodiment of the disclosure is shown. The process of upsampling is similar to the convolution process wherein an input is processed through a filter to generate an output. The differences are that upsampling typically has an output that is generally larger than the input. For example, the upsampling process depicted in FIGS. 6A and 6B depict a two by two numerical input matrix 650 being processed through a filter 670 to generate a four by four output matrix 660.

Figure 6B:
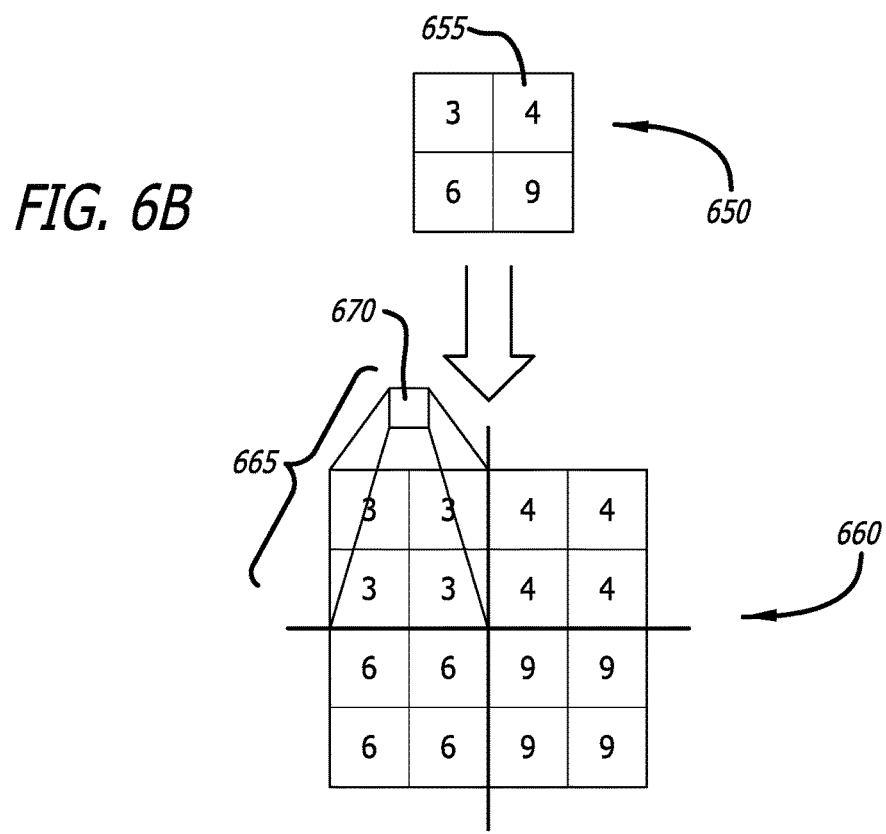
FIG. 6B is an illustrative numerical example of an upsampling process in accordance with an embodiment of the disclosure.

Specifically, referring to FIG. 6B, an illustrative numerical example of an upsampling process in accordance with an embodiment of the disclosure is shown. A first input block 655 of the input matrix 650 is processed through a filter 670 to generate a first output matrix block 665 within the output matrix 660. As will be recognized by those skilled in the art, the filter 670 of FIG. 6B is a "nearest neighbor" filter. This process is shown numerically through the example input block 655 which has a value of four being processed through a filter 670 that results in all values within the output matrix block 665 to contain the same value of four. The remaining input blocks within the input matrix 650 also follow this filter 670 to generate similar output blocks within the output matrix 660 that "expand" or copy their values to all blocks within their respective output matrix block.

Figure 6C:
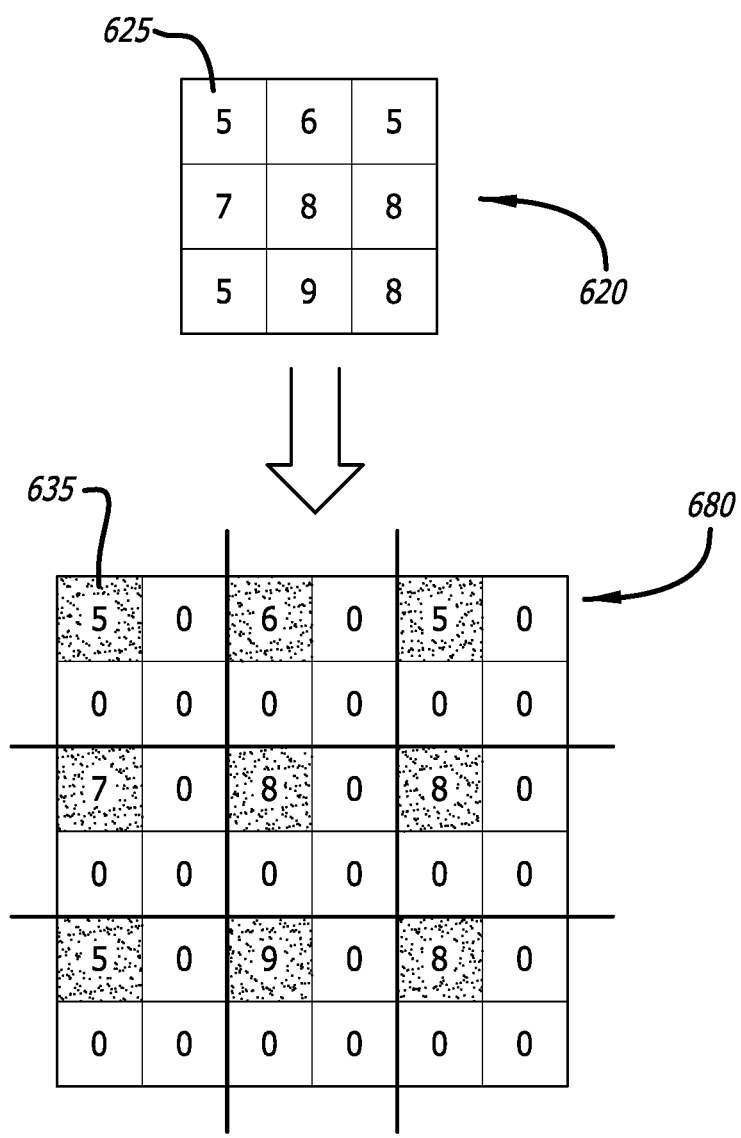
FIG. 6C is an illustrative numerical example of a second upsampling process in accordance with an embodiment of the disclosure.

Referring to FIG. 6C, an illustrative numerical example of a second upsampling process in accordance with an embodiment of the disclosure is shown. Although the upsampling process depicted in FIGS. 6A-6B utilize a filter that expands or applies the input value as output values to each respective output block, those skilled in the art will recognize that a variety of upsampling filters may be used including those filters that can apply their values to only partial locations within the output matrix.

As depicted in FIG. 6C, many embodiments of an upsampling process may pass the input value along to only one location within the respective output matrix block, padding the remaining locations with another value. In the case of the embodiment depicted in FIG. 6C, the other value utilized is a zero which those skilled in the art will recognize as a "bed of nails" filter. Specifically, the input value of the feature map data block 625 is transferred into the respective location 635 within the output data block 680. In these embodiments, the upsampling process will not be able to apply input values to any variable location within an output matrix block based on the original input data as that information was lost during the convolution process. Thus, as in the embodiment depicted in FIG. 6C, each input value from the input block (i.e. feature map) 620 can only be placed in the upper left pixel of the output data block 680.

In further embodiments however, upsampling processes may acquire a second input that allows for location data (often referred to as "pooling" data) to be utilized in order to better generate an output matrix block (via "unpooling") that better resembles or otherwise is more closely associated with the original input data compared to a static, non-variable filter. This type of processing is conceptually illustrated in FIG. 6D, which is an illustrative numerical example of an upsampling process utilizing a lateral connection in accordance with an embodiment of the disclosure.

The process for utilizing lateral connections can be similar to the upsampling process depicted in FIG. 6C wherein an input block (i.e. feature map) 620 is processed through a filter and upsampled into a larger unpooled output data block 690. However, instead of placing the input value (i.e. feature map data block) 625 and all other data blocks into the upper right corner as in FIG. 6C, another source of data can decide where the value goes. Specifically, the input data block 610 from the convolution processing earlier in the process can be utilized to provide positional information about the data. The input data block 610 can be "pooled" in that the input data block 610 stores the location of the originally selected maximum value from FIG. 6B. Then, utilizing a lateral connection to the upsampling process, the pooled data can be unpooled to indicate to the process (or filter) where the values in the input block (i.e. feature map) should be placed within each block of the unpooled output data block 690. Thus, the use of lateral connections can provide additional information for upsampling processing that would otherwise be unavailable, potentially reducing computational accuracy.

In additional embodiments, one feature map may have a higher resolution than a second feature map during a merge process. The lower resolution feature map may undergo an upsampling process as detailed above. However, once upsampled, the merge between the feature maps can occur utilizing one or more methods. By way of example, a concatenation may occur as both feature maps may share the same resolution. In these instances, the number of output channels after concatenation equals the sum of the number of the two input sources. In further embodiments, the merge process may attempt to add two or more feature maps. However, the feature maps may have differing numbers of associated channels, which may be resolved by processing at least one feature map through an additional downsampling (such as a 1×1 convolution). Utilizing data from a convolution process within an upsampling process is described in more detail within the discussion of FIG. 7.

Figure 7:
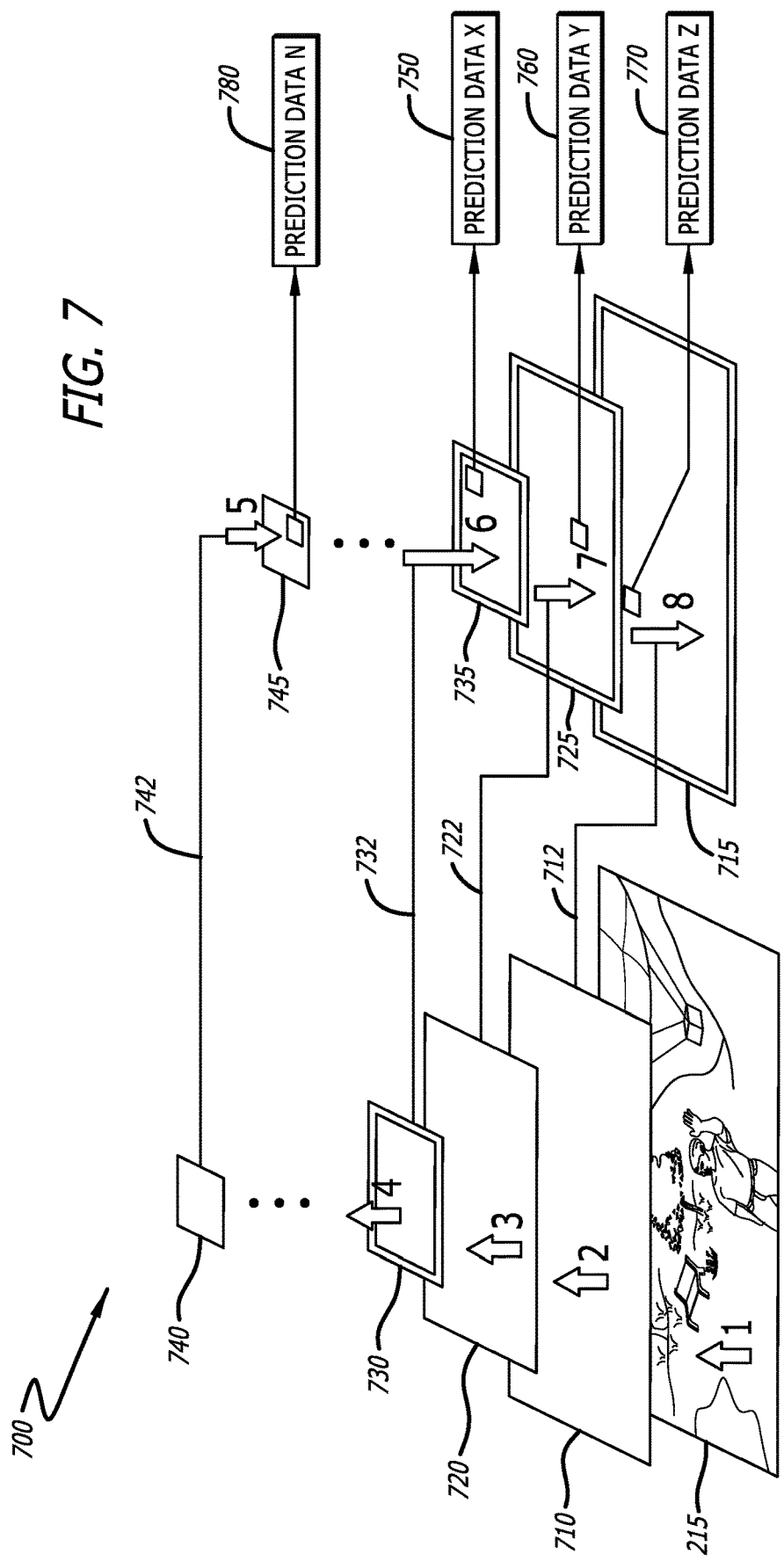
FIG. 7 is a conceptual illustration of a feature pyramid network in accordance with an embodiment of the disclosure.

Referring to FIG. 7, a conceptual illustration of a feature pyramid network 700 in accordance with an embodiment of the disclosure is shown. As described above, any type of time-series data can be processed by the processes and methods described herein. However, in order to conceptually illustrate embodiments of the disclosure, the example depicted in FIG. 7 utilizes video content (specifically a still image gathered from video image data) for processing. Generally speaking, the feature pyramid network 700 takes an input image 215 (such as the video frame from FIG. 2) and processes the image through a series of two "pathways." The first pathway is a "convolution and pooling pathway" which comprises multiple downsampling steps (1-4). This pathway is also known as a "bottom-up" pathway as the feature pyramid can conceptually be understood as working from a bottom input image up through a series of convolution filters. Conversely, the second pathway is known as an "upsampling pathway" which processes the input data from the convolution pathway through a series of upsampling steps (5-8). This pathway is also known as a "top-down" pathway similarly because it can be visualized as taking the output of the bottom-up process and pushing it down through a series of upsampling filters until the final conversion and desired output is reached.

While layers reconstructed in the top-down pathway are semantically rich, the locations of any detected objects within the layers are imprecise due to the previous processing. However, additional information can be added through the use of lateral connections 712, 722, 732 between a bottom-up layer to a corresponding top-down layer. A data pass layer 742 can pass the data from the last layer from the "bottom-up" path to the first layer of the "top-down" path. These lateral connections 712, 722, 732 can help the feature pyramid network 700 generate output that better predicts locations of objects within the input image 215. In certain embodiments, these lateral connections 712, 722, 732 can also be utilized as skip connections (i.e., "residual connections") for training purposes.

The feature pyramid network of FIG. 7 receives an input image 215 and processes it through one or more convolution filters to generate a first feature map layer 710. The first feature map layer 710 is then itself processed through one or more convolution filters to generate a second feature map layer 720 which is itself further processed through more convolution filters to obtain a third feature map layer 730. As more feature maps are generated, the resolution of the feature maps being processed is reduced, while the semantic value of each feature map increases. It should also be understood that while each step within the feature pyramid network 700 described within FIG. 7 is associated with a single feature map output or upsampling layer output, an actual feature pyramid network may process any number of feature maps per input image and that the number of generated feature maps (and associated upsamplings) can increasingly scale as further layers within the bottom-up process are generated. In certain embodiments, a single input image can generate an unbound number of feature maps and associated upsamplings during the bottom-up and top-down processes. The number of feature maps generated per input data is limited only by computing power available or design based on the desired application.

The feature pyramid network 700 can continue the convolution process until a final feature map layer 740 is generated. In some embodiments, the final feature map layer 740 may only be a single pixel or value. From there, the top-down process can begin by utilizing a first lateral connection to transfer a final feature map layer 740 for upsampling to generate a first upsampling output layer 745. At this stage, it is possible for some prediction data N 780 to be generated relating to some detection within the first upsampling output layer 745. Similar to the bottom-up process, the top-down process can continue processing the first upsampling output layer 745 through more upsampling processes to generate a second upsampling output layer 735 which is also input into another upsampling process to generate a third upsampling output layer 725. Along each of these layers, prediction data 750, 760, 770 may be generated and utilized in a variety of manners depending on the application desired. In a number of embodiments, this process continues until the final upsampling output layer 715 is the same, or similar size as the input image 215. However, as discussed above, utilizing upsampling processing alone will not generate accurate location prediction data for detected objects within the input image 215. Therefore, at each step (5-8) within the upsampling process, a lateral connection 712, 722, 732 can be utilized to add location or other data that was otherwise lost during the bottom-up processing. By way of example and not limitation, a value that is being upsampled may utilize location data received from a lateral connection to determine which location within the upsampling output to place the value instead of assigning an arbitrary (and potentially incorrect) location. As each input image has feature maps generated during the bottom-up processing, each step (5-8) within the top-down processing can have a corresponding feature map to draw data from through their respective lateral connection.

It will be recognized by those skilled in the art that each convolution and/or upsampling step (5-8) depicted in FIG. 7 can include multiple sub-steps or other operations that can represent a single layer within a neural network, and that each step (1-8) within the feature pyramid network 700 can be processed within a neural network as such and that FIG. 7 is shown to conceptually explain the underlying process within those neural networks. Furthermore, various embodiments can utilize additional convolution or other similar operations within the top-down process to merge elements of the upsampling outputs together. For example, each color channel (red, green, blue) may be processed separately during the bottom-up process but then be merged back together during one or more steps of the top-down process. In further embodiments, these additional merging processes may also receive or utilize feature map data received from one of the lateral connections 712, 722, 732.

Figure 8A:
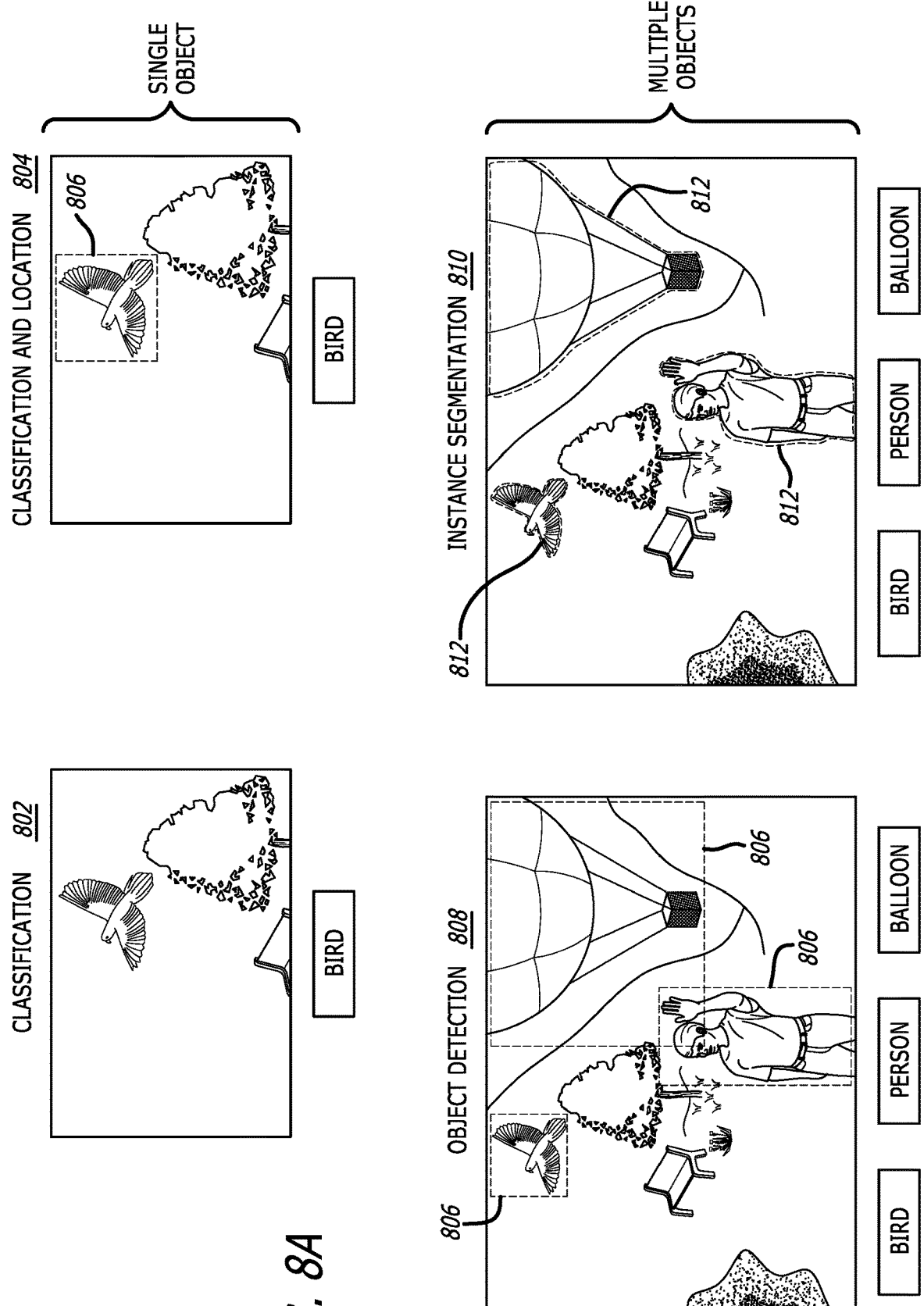
FIG. 8A is an illustrative comparison between image classification, object detection, and instance segmentation in accordance with an embodiment of the disclosure.

Referring to FIG. 8A, an illustrative comparison between image classification, object detection, and instance segmentation in accordance with an embodiment of the disclosure is shown. While discussions and illustrations above have referenced utilizing embodiments of the present disclosure for object detection within an input image or input video content, it should be understood that a variety of data classification/prediction data may be generated based on the feature pyramid network as described in FIG. 7.

For example, when a single object is in an image, a classification model 802 may be utilized to identify what object is in the image. For instance, the classification model 802 identifies that a bird is in the image. In addition to the classification model 802, a classification and localization model 804 may be utilized to classify and identify the location of the bird within the image with a bounding box 806. When multiple objects are present within an image, an object detection model 808 may be utilized. The object detection model 808 can utilize bounding boxes to classify and locate the position of the different objects within the image. An instance segmentation model 810 can detect each major object of an image, its localization, and its precise segmentation by pixel with a segmentation region 812. The inference map image 210 of FIG. 2 is shown as a segmentation inference map image.

In many embodiments, the image classification models can be utilized to generate a determination as to whether a specific object is located within the image. In further embodiments, the image classification models can attempt to classify images into a single category, usually corresponding to the most salient object. Images and videos are usually complex and contain multiple objects which can make label assignment with image classification models tricky and uncertain. Therefore, in a variety of embodiments, the processing of the video image data will generate a binary output that can trigger further processing and/or manual intervention. Often, specialized object detection models can be more suitable for identifying multiple relevant objects in a single image. Additionally, many object detection models can provide localization of objects.

Traditionally, models utilized to perform image classification, object detection, and instance segmentation included, but were not limited to, Region-based Convolutional Neural Network (R-CNN), Fast Region-based Convolutional Neural Network (Fast R-CNN), Faster Region-based Convolutional Neural Network (Faster R-CNN), Region-based Fully Convolutional Neural Network (R-FCN), You Only Look Once (YOLO), Single-Shot Detector (SSD), Neural Architecture Search Net (NASNet), and Mask Region-based Convolutional Network (Mask R-CNN). While embodiments of the disclosure utilize feature pyramid network models to generate prediction data, certain embodiments can utilize one of the above methods during either the bottom-up or top-down processes based on the needs of the particular application.

In many embodiments, models utilized by the present disclosure can be calibrated during manufacture, development, and/or deployment. Additionally, it is contemplated that multiple models, modes, and hardware/software combinations may be deployed within the asynchronous neural network system and that the system may select from one of a plurality of neural network models, modes, and/or hardware/software combinations based upon the determined best choice generated from processing input variables such as input data and environmental variables. In fact, embodiments of the present disclosure can be configured to switch between multiple configurations of the asynchronous neural network as needed based on the application desired and/or configured. For example, U.S. Patent Application titled "Object Detection Using Multiple Neural Network Configurations", filed on Feb. 27, 2020 and assigned U.S. application Ser. No. 16/803,851 (the '851 application) to Wu et al. discloses deploying various configurations of neural network software and hardware to operate at a more optimal mode given the current circumstances. These decisions on switching modes may be made by a controller gathering data to generate decisions. The disclosure of the '851 application is hereby incorporated by reference in its entirety, especially as it pertains to generating decisions to changes modes of operations based on gathered input data.

Figure 8B:
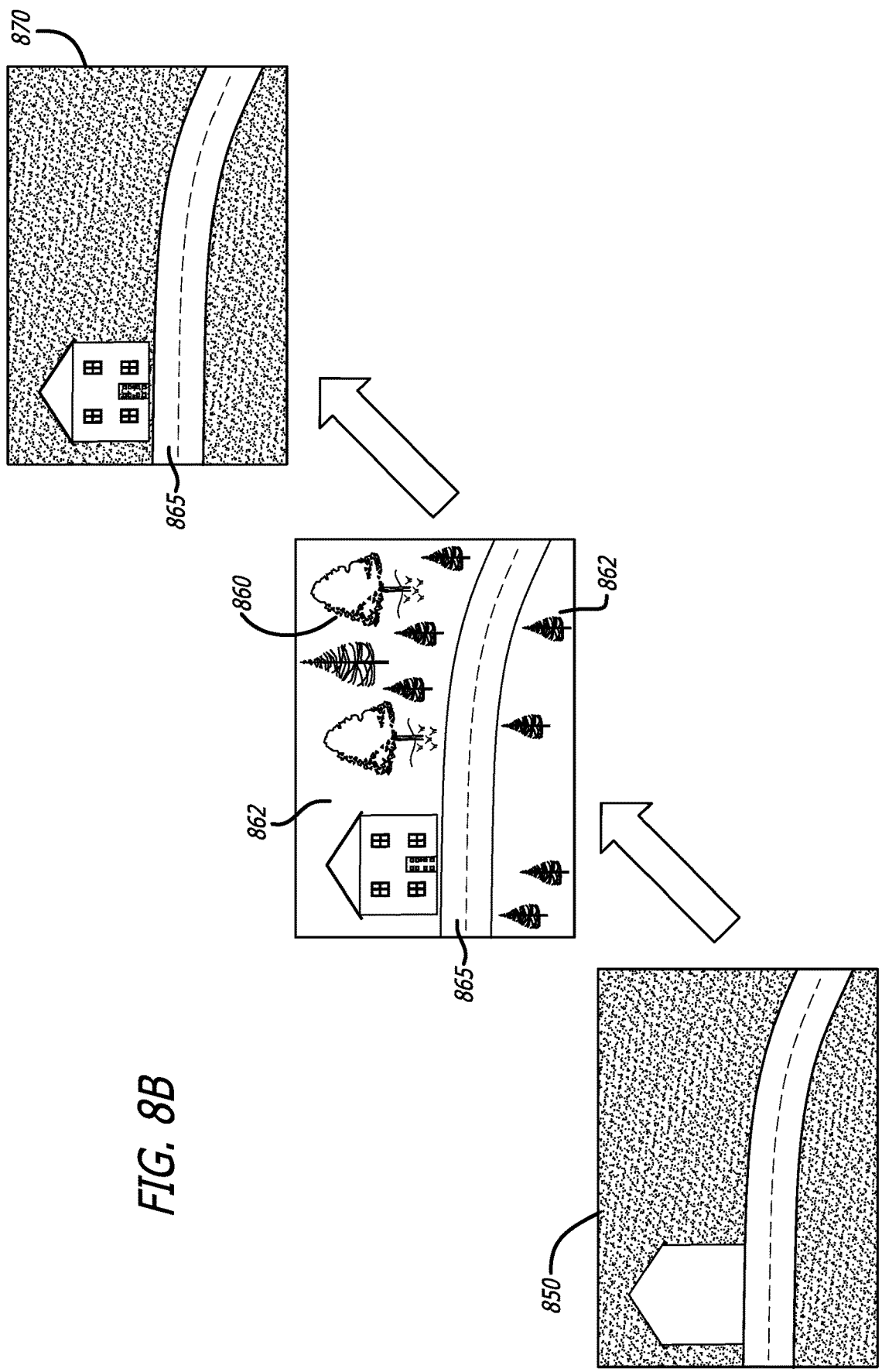
FIG. 8B is a conceptual illustration of the application of an attention mask to a video image in accordance with an embodiment of the disclosure.

Referring to FIG. 8B, a conceptual illustration of the application of an attention mask 850 to a video image 860 in accordance with an embodiment of the disclosure is shown. Once an attention mask 850 is generated, it can be applied to a plurality of video image data from the same camera and/or video capture device. The attention mask 850, video image 860, and resulting masked image 870 are conceptually shown in FIG. 8B to better communicate the overall process and application of attention masks. Those skilled in the art will recognize that this process can often be mathematically generated, without the direct generation of a masked image 870.

The example generation of a masked image 870 within FIG. 8B depicts a video image 860 that comprises a road 865, a building, and multiple forested areas 862. By way of example and not limitation, the application desired may require the detection of people within the video image 860 that is one image within a larger set of video image data. After recording a set of sample video image data from the camera, the attention mask 850 was generated based on the results that showed that detected people were more likely to be found within the road 865 and/or building area and not within the forested areas 862. The attention mask can be visualized as a filter that segments the forested areas 862 from the road 865 and building within the video image 860. This is the likely result as the forested area 862, road 865, and building are stationary objects within the field of view of the camera gathering the video image data.

Once applied to the video image 860, the resulting product is a masked image 870. The attention mask 850 can then be applied to subsequent video images within a video image data set. The application of the attention mask 850 to the video image 860 can be the result of a product between an image tensor and a mask. In certain embodiments, the product utilized is a Hadamard product between the attention mask 850 and a video image 860 tensor. The masked image 870 can be input and processed into the video processing system within the need for any resampling.

While the example generation of a masked image 870 within FIG. 8B produces only a few segmentations (i.e. object detections) between the objects within the image, various embodiments can process attention masks for more complex video images that may have dozens, if not hundreds of objects. Because the attention mask can be reused upon all subsequent video images for processing (until the camera or capture device is moved), the computational costs of generating a complex attention mask are relatively small. Thus, this process may work over a variety of environments.

Typical image classification network pipelines are not dependent on position information. In fact, efforts are normally made to remove position information to ensure consistent classification output with translation and rotation invariance. In many video surveillance environments, a camera is pointed in a static direction and objects (such as pedestrians) are expected to occur in certain sections of the video frame. Therefore, it can be beneficial to focus the computational resources, or "attention", of a neural network on these sections while ignoring the irrelevant image areas. To this end, various embodiments utilize a mask layer that is applied to the video image data that is then input to a neural network for processing.

The attention mask is typically applied to a plurality of video image data. The input video image data for processing can a 3-dimensional integer tensor, $$I \in \mathbb{Z}^{[h,w,c]}$$

where h, w are the image height and width, respectively, and c is the number of color channels. In a variety of embodiments, the attention mask can be applied as a per-pixel, or elementwise, product of the image tensor (such as a Hadamard product), I, and the attention mask, M to generate a masked image $I_m$ as shown below:

$$I_m = I \odot M$$

The dimensions of the mask, M, can be the same as that of the image I. Alternatively, since the position information does not depend on color, M can be a 2-dimensional matrix with:

$$M \in \mathbb{Z}^{[h,w]}$$

which is applied to all color channels c.

In many embodiments, the generation of the image mask, M, is to train it offline on a relatively small set of sample images from, for example, the surveillance camera, using the output of an object detection network with high accuracy and recall. For example, Mask RCNN is a neural network that provides a bounding box output for each detected object in addition to a per-pixel object classification mask and may be utilized to generate an attention mask. An example of a detection output is similar to what is shown in FIG. 8A, wherein one or more objects is highlighted with a pixel mask such as the segmentation region 812 from the instance segmentation model 810 and/or outlined with a bounding box 806 such as in the object detection model 808. In certain embodiments, a confidence level of the detected object is also calculated and provided.

The size of the training set necessary to generate an attention mask can, in many instances, be much smaller than that required to train an entire neural network. The training data set can include object positions representative of the expected positions throughout the time that the network will be used on the plurality of cameras. When one of the cameras has changed positions, a request to generate a new attention mask can be made. One method of generating new attention masks is to utilize a histogram method.

A 2-dimensional histogram of the frequency of detected pedestrians in the training set can be compiled as:

$$H \in \mathbb{Z}^{[h,w]}$$

where $$H_{i,j} \in [0,n]$$

where n is the number of examples in the mask training dataset and i and j are image pixel row and column indices, respectively. The histogram, H, can be compiled with a specialized neural network (such as a Mask RCNN) utilizing either a bounding box output and/or a per-pixel object mask. In some embodiments, the generation of the attention mask can be generated utilizing stochastic gradient descent methods. The attention mask, M, can be computed from the histogram as:

$$M_{i,j} = \begin{cases} 0, \text{if } H_{i,j} \leq t \\ 1, \text{if } H_{i,j} > t \end{cases}$$

where t is a histogram threshold value. In a number of embodiments, the histogram threshold, t, can used to set the mask pixels to either 0 or 1. The threshold t can be in the range of $$t \in [0,n]$$

with 0 being configured to accept all object detection occurrences as valid, resulting in the most inclusive attention mask possible. In a number of embodiments, the threshold t acts as a heuristic qualifier that restricts setting the attention mask to 1. With t>0, there must be at least one occurrence of the desired object type of the selected pixel.

Depending on the desired application of the attention mask, various qualifications may be performed upon the attention mask or histogram for refinement. In some embodiments, the attention mask may be further qualified utilizing confidence data generated by the specialized neural network. As described above, a confidence level value may be generated by the specialized neural network for each object detected within the training video image data set. In various embodiments, the histogram may only be updated if a particular confidence level is above a pre-determined confidence threshold value. The pre-determined confidence threshold value may be adjusted to filter out lower confidence detections. Thus, utilizing a high confidence threshold value can generate a histogram (and subsequent attention mask) that is only changed in response to high-confidence detections.

In additional embodiments, qualification of the histogram may also include selecting whether changes and/or updates to the histogram are based on the detected objects segmentation pixel value or bounding box area. As described above, the specialized neural network may generate either a segmentation region that corresponds to the exact pixels the detected object inhabits, or a bounding box that represents the smallest rectangle wherein all of the pixels within the segmentation occur. Utilizing segmentation pixel values more precisely matches the shape and position of each detected object, but the bounding box method is a bit more general. However, a data set used for attention mask generation that is too small may not cover all possible pixels for object segmentation.

In further embodiments, the specialized neural networks can be configured to provide semantic region segmentation (via an instance segmentation model similar to 810 of FIG. 8A). This may be provided in addition to the raw detection data described above. In numerous embodiments, the histogram and/or attention mask may be adjusted based on this data. By way of example, and not limitation, a static security camera may generate a series of video image data that, when processed via panoptic segmentation (or other similar process), generates segmentation over the images that show a road, forests, and a sky. If the desired application was to detect the presence of pedestrians within the view of the camera, the histogram and/or attention mask may be generated and/or altered only when the detections are within valid segmentations. (No need to update the histogram if the detected pedestrian was in the sky regions.) In still further embodiments, the segmentation may be configured to provide weights to the pre-determined confidence threshold levels. For example, a pedestrian detected on a sidewalk or roadway segmentation may be more likely to alter the histogram and/or attention mask than if the pedestrian was detected within a forest segmentation.

In yet additional embodiments, one or more motion controls may be utilized such that the histogram and/or attention mask is only updated or changed in response to detected objects that are moving. This may avoid the detection of static objects that are not desired. For example, if the desired application was to detect pedestrians within a monitored area, the motion requirements may provide a means to avoid positively detecting a statue within the monitored area. An example of a motion requirement may be to avoid updating the histogram and/or attention mask if the detected object has not moved over a pre-determined timeframe.

Figure 9:
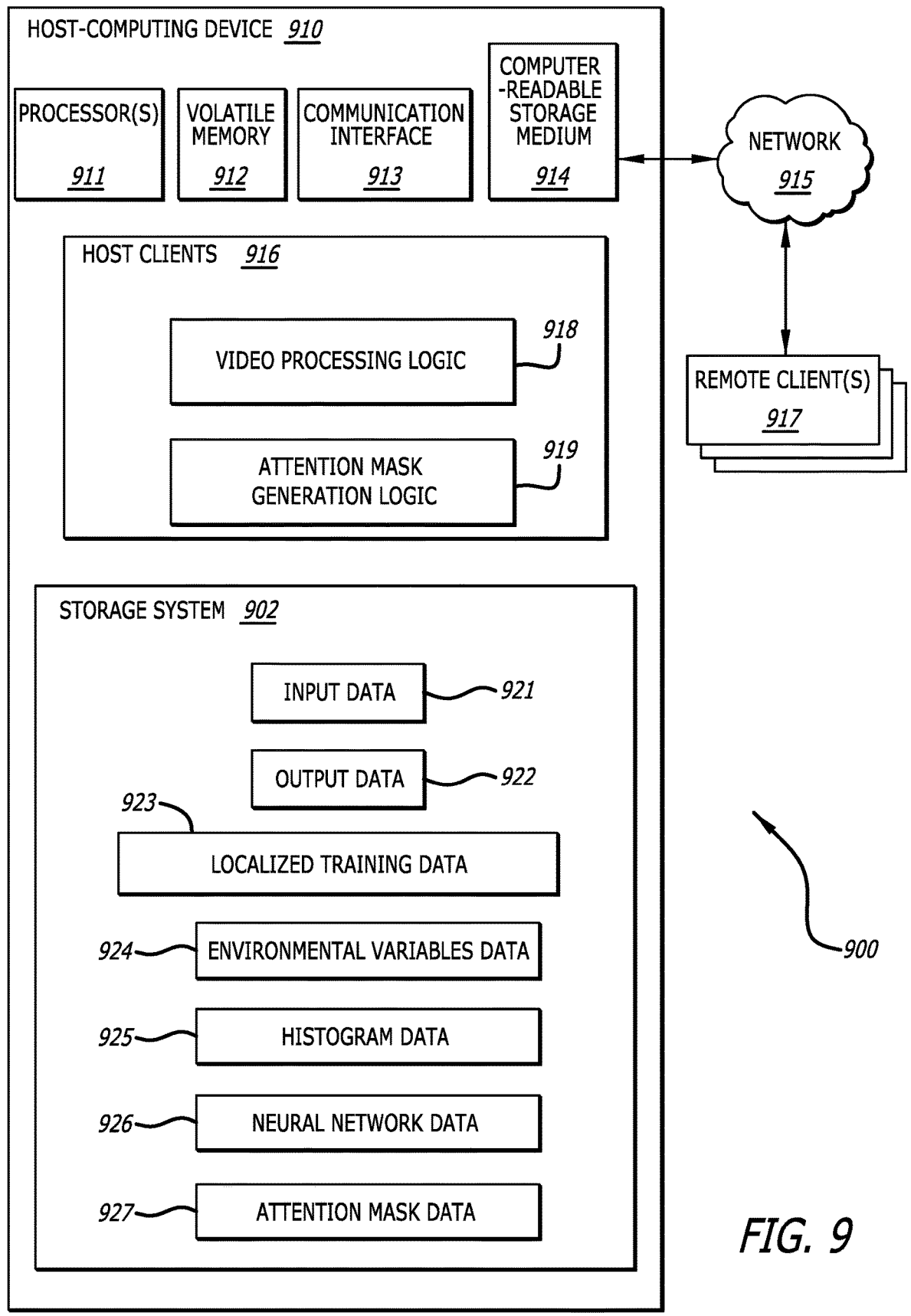
FIG. 9 is a schematic block diagram of a host-computing device capable of utilizing attention masks during video image data processing in accordance with an embodiment of the disclosure.

Referring to FIG. 9, a schematic block diagram of a host-computing device capable of utilizing attention masks during video image data processing in accordance with an embodiment of the disclosure is shown. The video image data processing system 900 can comprise one or more host clients 916 paired with one or more storage systems 902. The host-computing device 910 may include a processor 911, volatile memory 912, and a communication interface 913. The processor 911 may include one or more central processing units, one or more general-purpose processors, one or more application-specific processors, one or more virtual processors (e.g., the host-computing device 910 may be a virtual machine operating within a host), one or more processor cores, or the like. The communication interface 913 may include one or more network interfaces configured to communicatively couple the host-computing device 910 and/or the storage system 902 to a communication network 915, such as an Internet Protocol (IP) network, a Storage Area Network (SAN), wireless network, wired network, or the like.

The storage system 902 in various embodiments can include one or more storage devices and may be disposed in one or more different locations relative to the host-computing device 910. The storage system 902 may be integrated with and/or mounted on a motherboard of the host-computing device 910, installed in a port and/or slot of the host-computing device 910, installed on a different host-computing device 910 and/or a dedicated storage appliance on the network 915, in communication with the host-computing device 910 over an external bus (e.g., an external hard drive), or the like.

The storage system 902, in one embodiment, may be disposed on a memory bus of a processor 911 (e.g., on the same memory bus as the volatile memory 912, on a different memory bus from the volatile memory 912, in place of the volatile memory 912, or the like). In a further embodiment, the storage system 902 may be disposed on a peripheral bus of the host-computing device 910, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage system 902 may be disposed on a data network 915, such as an Ethernet network, an Infiniband network, SCSI RDMA over a network 915, a storage area network (SAN), a local area network (LAN), a wide area network (WAN) such as the Internet, another wired and/or wireless network 915, or the like.

The host-computing device 910 may further comprise a computer-readable storage medium 914. The computer-readable storage medium 914 may comprise executable instructions configured to cause the host-computing device 910 (e.g., processor 911) to perform steps of one or more of the methods or logics disclosed herein. Additionally, or in the alternative, the video processing logic 918 and/or the attention mask generation logic 919 may be embodied as one or more computer-readable instructions stored on the computer-readable storage medium 914.

The host clients 916 may include local clients operating on the host-computing device 910 and/or remote clients 917 accessible via the network 915 and/or communication interface 913. The host clients 916 may include, but are not limited to: operating systems, file systems, database applications, server applications, kernel-level processes, user-level processes, and the depicted video processing logic 918 and/or attention mask generation logic 919. The communication interface 913 may comprise one or more network interfaces configured to communicatively couple the host-computing device 910 to a network 915 and/or to one or more remote clients 917.

Although FIG. 9 depicts a single storage system 902, the disclosure is not limited in this regard and could be adapted to incorporate any number of storage systems 902. The storage system 902 of the embodiment depicted in FIG. 9 includes input data 921, output data 922, localized training data 923, environmental variables data 924, histogram data 925, neural network data 926, and attention mask data 927. These data 921-927 can be utilized by one or both of the video processing logic 918, and attention mask generation logic 919.

In many embodiments, the video processing logic 918 can direct the processor(s) 911 of the host-computing device 910 to generate one or more multi-stage neural networks, utilizing neural network data 926 which can store various types of neural network models, weights, and various inputs and outputs configurations. The video processing logic 918 can further direct the host-computing system 910 to establish one or more input and output pathways for data transmission. Input data transmission can utilize input data 921 which is typically any time-series or video image data. However, as discussed previously, many embodiments utilize video content as a main source of input data 921, even if there is no limitation on that data format.

The video processing logic 918 can also direct the processor(s) 911 to call, instantiate, or otherwise utilize an attention mask generation logic 919. The attention mask generation logic 919 can begin the attention mask generation process by inputting localized training data 923 which can often be sample video image data taken from one or more cameras, and/or video capture devices. The generation of the attention mask is described in more detail below with reference to FIG. 12. However, in a variety of embodiments, the attention mask generation logic 919 can utilize the localized training data 923 along with any other configuration data (such as how any threshold values may be updated) to generate histogram data 925 that can be updated and processed to generate the attention mask data 927. The attention mask data 927 can be utilized by the video processing logic 918 to generate masked images for processing within the neural network.

While some embodiments of the disclosure are similar to that depicted in FIG. 9, additional embodiments may utilize an external device, such as a training server, to comprise the attention mask generation logic 919. In still further embodiments, the video processing logic 918 may have access to multiple attention mask generation logics 919 which may each be specialized to detect unique objects within video image data such that multiple attention masks may be created and applied to one or more parallel video image data sets. In this way, multiple objects may be detected utilizing parallel processing of multiple attention masks.

The determination of when to generate a new attention mask can be determined in variety of ways. In some embodiments, the object detection system utilizes stationary cameras which can require the generation of an attention mask upon installation/initialization of the system. In further embodiments, the cameras may have sensors that indicate when it has been moved, which can then generate a request to acquire a new attention mask. In still additional embodiments, the cameras and/or video capture devices may be subject to seasonal or other time-related changes. In these embodiments, a time-based threshold may be set that, when exceeded, generates a request for a new attention mask. In this way, as the seasons or other environmental variable data 924 changes, the attention mask can still be valid.

Finally, when the masked images are processed by the video processing logic 918, output data 922 is created which can be utilized to indicate if any specified objects were found to be in one or more video images of the video image data. The output data 922 may then subsequently be used by another system to generate a notification that further analysis is required for a particular portion of the video image data. In some embodiments, the notification generation is handled by the video processing logic 918 and immediately generated as the output data 922.

Figure 10:
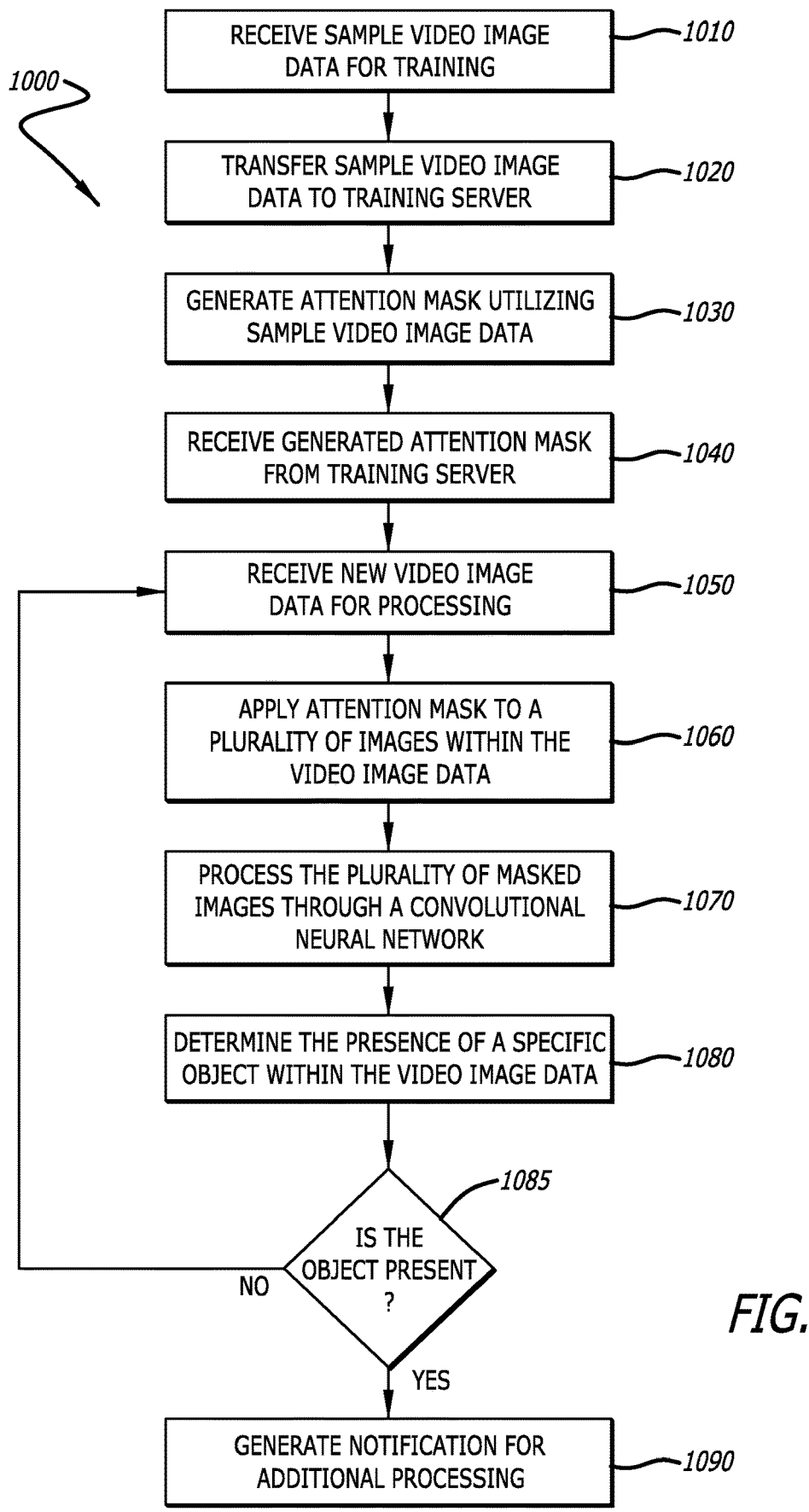
FIG. 10 is a flowchart depicting a process for determining the presence of a specific object within processed video data utilizing attention masks in accordance with an embodiment of the disclosure.

Referring to FIG. 10, a flowchart depicting a process 1000 for determining the presence of a specific object within processed video data utilizing attention masks in accordance with an embodiment of the disclosure is shown. Video processing systems may be deployed to monitor video image data and generate one or more determinations in response to a specified object being located within the monitored area. The generation of those determinations can be aided by the use of an attention mask which may be generated internally or externally on a training server.

In many embodiments, the process 1000 first receives a plurality of sample video image data for training (block 1010). Typically, this is footage captured from one or more (often stationary) cameras. In some embodiments, the sample video image data can be capture through other means and simply uploaded or added to the system as a separate video data file. The received sample video image data can be transferred to a training server or other attention mask generation logic (block 1020). The training server can then generate an attention mask utilizing the received sample video image data (block 1030). As discussed above, the generation can be done via one or more specialized neural networks such as, but not limited to, a mask convolutional neural network. The completed attention mask is subsequently sent to and received by the video processing system from the training server (block 1040).

The video processing system can continue to capture and/or receive new video image data for processing (block 1050). The video image data may be directly received from a live feed provided by one or more cameras but may also be manually fed into the system as a raw video file or time-series set of still images configured to be processed with an attention mask. Prior to the processing of the video, the process 1000 can apply one or more of the pre-generated attention masks to the plurality of images within the video image data prior to processing (block 1060). In many embodiments, the attention mask is applied to the video image data to indicate when processing should occur. The resulting masked images can then be processed through one or more neural networks such as a convolutional neural network (block 1070). Based on the pre-processing, the neural network can limit processing to the areas indicated by the attention mask.

The neural network can generate an output for the series of pre-processed masked images corresponding to the detection of one or more pre-determined objects within the masked image. Often, the output of the convolutional neural network can indicate if a specific object was located within the image, thus allowing for a determination to be produced (block 1080). In some embodiments, the determination may be a numerical value generated by the output of one or more neural networks. The process 1000 can then determine, based on the generated value output of the video processing neural network, if the specified object is present within the video image (block 1085). When no presence is detected, the process 1000 can continue to receive and process new video image data (block 1050). Conversely, if a specific object has been determined to be within the video image, the process 1000 may generate one or more notifications indicating that further processing may be necessary (block 1090). The notification may be a signal sent to another automatic video processing system or may pass the original video image data to another specialized neural network. In still further embodiments, the notification may be generated in a format suitable to alert a system monitor and/or administrator to manually review the image data.

Figure 11:
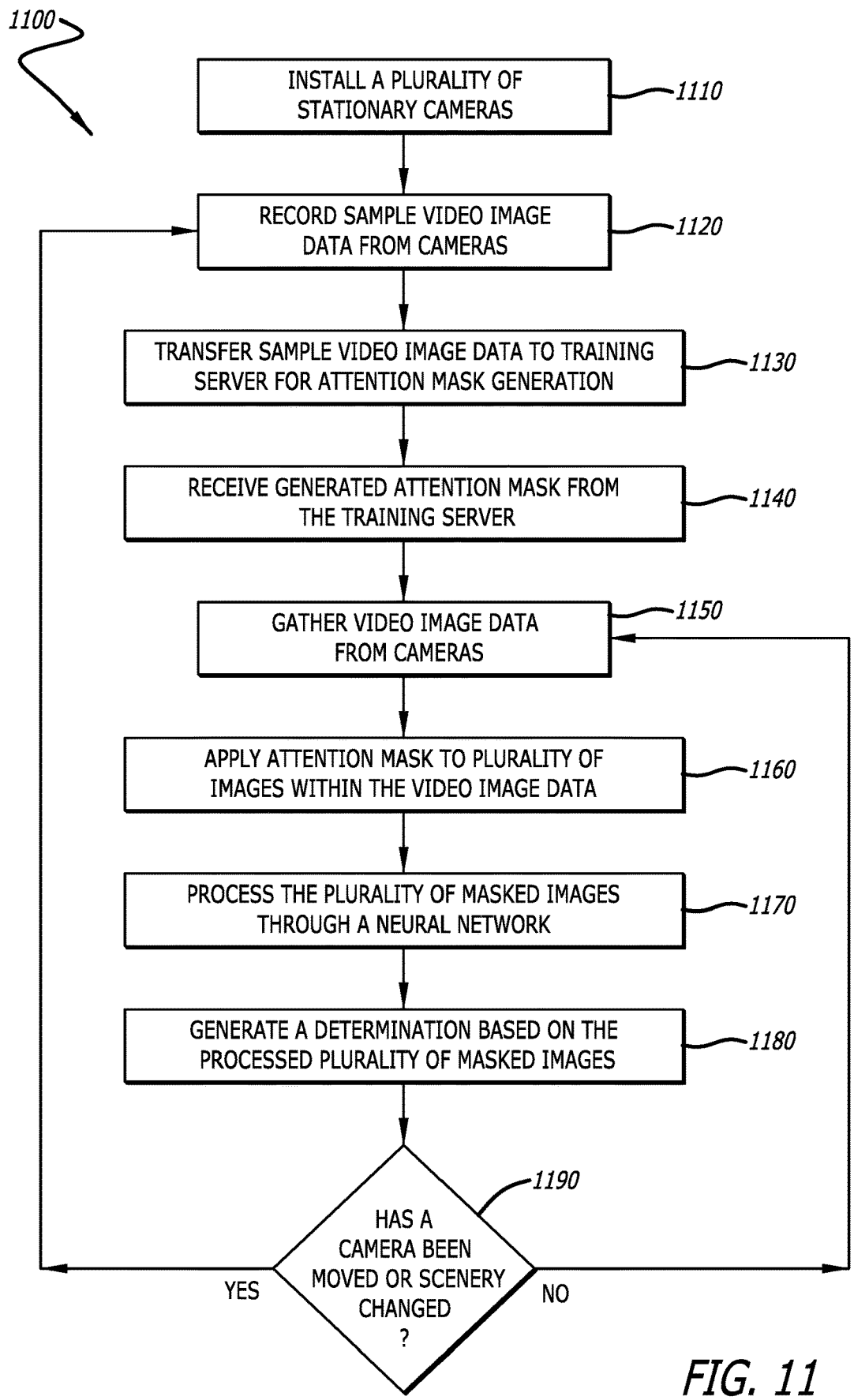
FIG. 11 is a flowchart depicting a process for requesting and utilizing an attention mask suitable for processing video image data in accordance with an embodiment of the disclosure.

Referring to FIG. 11, a flowchart depicting a process 1100 for requesting and utilizing an attention mask suitable for processing video image data in accordance with an embodiment of the disclosure is shown. The process 1000 typically begins by setting up one or more monitored areas. Monitored areas can be created by installing a plurality of stationary cameras (block 1110). It is contemplated that other video capture devices beyond stationary cameras may be utilized, and certain embodiments of the process 1100 may utilize previously installed cameras that do not need specialized installation for use within the process 1100.

Because each camera or video capture device covers a unique viewpoint, a unique attention mask will need to be generated for each one. The first step to generate a new attention mask to is to capture or record a sample of video image data from each of the cameras (block 1120). The length of each capture may vary depending on the type of attention mask desired (standard or including one or more qualifications as described above) and/or the effectiveness of the specialized neural network that will be generated the mask. Once generated, the sample video image data can be transferred to a training server to generate the attention mask in one or more specialized neural networks (block 1130). As discussed above, the training server may be an external computing device connected over a network or may be a separate logic within the same host device as the subsequent video processing logic.

Once generated, the attention mask can be received from the training server (block 1140). In response to acquiring an attention mask, the process 1100 can begin to gather video image data from one or more of the plurality of cameras (block 1150). Video images are captured and processed as images that are suitable for inputting into one or more neural networks for processing. Prior to processing within those neural networks however, the process 1100 applies the generated attention mask to each of the plurality of images within the captured video image data (block 1160). The attention mask can be pre-processed to match the size or attributes of the video image data prior to application. This may be done through one or more mask shape filters such as, but not limited to, a smoothing spatial filter which may, for example, round out the edges of the attention mask and make it more generalized for use in larger sets of data.

The plurality of masked images may be processed through one or more neural networks such as a convolutional neural network as described above (block 1170). The output of the neural networks can then be utilized to generate a determination of the presence of one or more specified objects within the video image data (block 1180). The masked images may be configured to provide guidance to the processing neural network as to which areas within the image are suitable for processing and which areas should be ignored. This can save computational processing time and cycles and can lead to more accurate and faster detections within the processed video image data.

Many embodiments of the disclosure require that a new attention mask be generated for each unique view within a camera or video capture device within the video image processing system. As such, the process 1100 may evaluate or assess if one or more cameras within the system have been moved or if the overall scenery captured by the camera has significantly changed (block 1190). If there has been a change, the process 1100 can again start the process of generated a new attention mask for that view by recording sample video image data from the camera (block 1120). When no movement or significant change has been detected, then the process 1100 can continue to gather video image data from the cameras (block 1150). It is contemplated that notifications of camera movement may be manually input by a systems administrator or may be automatically generated based on one or more sensors within the video capture device itself, and/or if one or more aspects of the video image data changes such that a threshold is exceeded when applying or processing the video image data indicating a change in overall incoming data.

Figure 12:
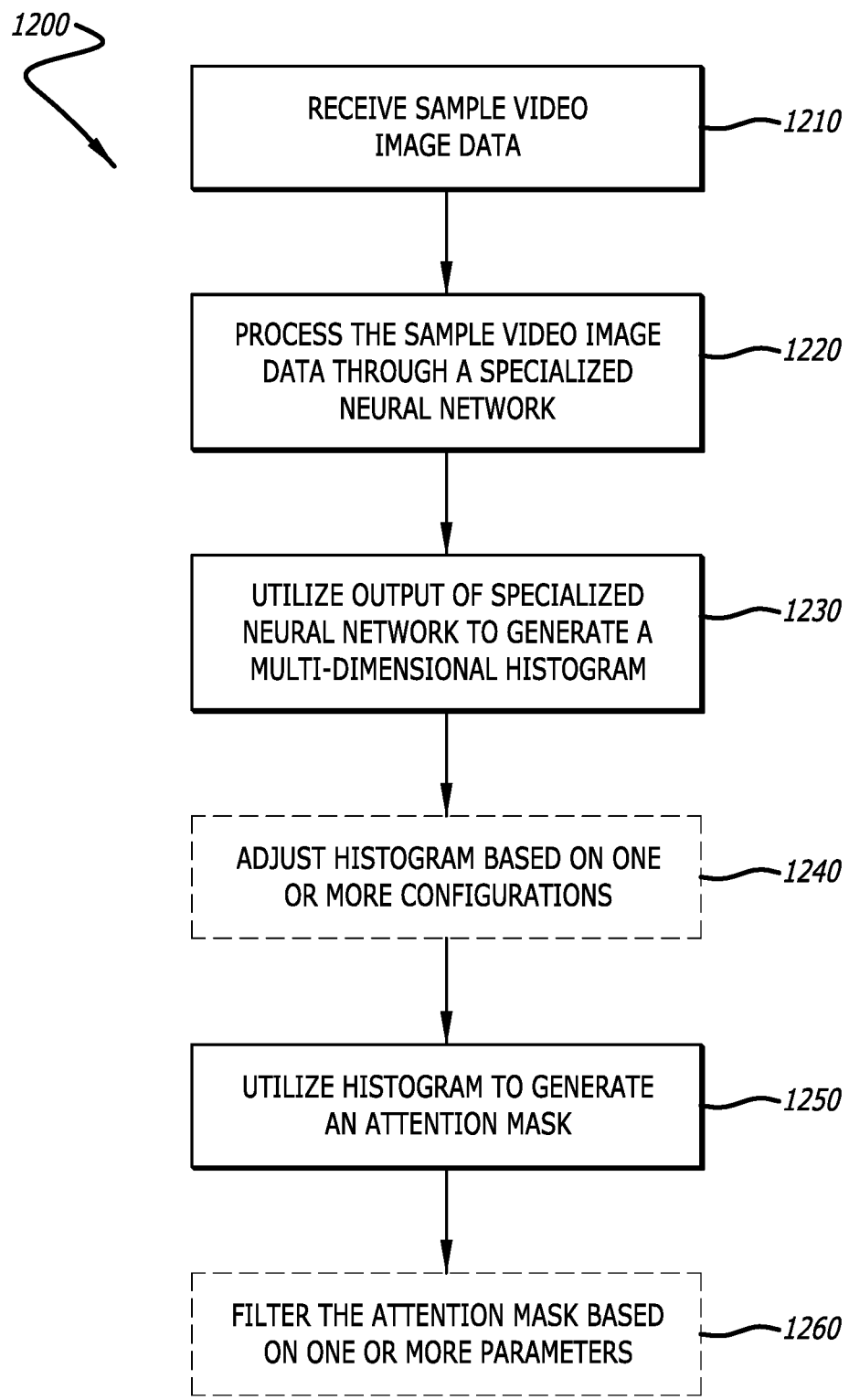
FIG. 12 is a flowchart depicting a process for generating an attention mask suitable for processing video image data in accordance with an embodiment of the disclosure.

Referring to FIG. 12, a flowchart depicting a process 1200 for generating an attention mask suitable for processing video image data in accordance with an embodiment of the disclosure is shown. As described above, various embodiments of the disclosure include a training server which serves as a separate or remote device that can generate an attention mask for another video processing system. In additional embodiments, the use of a training server may allow for retroactive use of attention masks within video processing systems that may otherwise not be able to generate attention masks suitable for processing as described herein. However, in further embodiments, the training server may be comprised of one or more logics located within the same device or system that is subsequently processing the video once the attention mask is received.

A training server may execute a process 1200 that begins by receiving sample video image data for use in training (block 1210). The amount of sample video image data may vary depending on the exact application. In certain embodiments, the training server may transmit a request for a particular amount of data necessary for training. In further embodiments, the device transmitting the sample video image data will be configured to deliver a pre-determined amount of data. In still further embodiments, the device transmitting the sample video may dynamically adjust the amount of video sent based on one or more factors including file size, content complexity, or the like.

In response to receiving the sample video image data, the training sever may then process the data through at least one specialized neural network (block 1220). The specialized neural network may be a convolutional neural network that can output data that may be utilized to generate a histogram or other attention mask data (block 1230). In some embodiments, the specialized neural network may be a mask convolutional neural network that can output pixel masks or bounding boxes associated with specific detected objects within the sample video data.

As discussed above with reference to FIG. 8B, the generation of the histogram data may be adjusted or qualified based on one or more configurations within the training server (block 1240). In particular embodiments, the request for the generation of an attention mask may include settings or requests for such configurations. In additional embodiments, the training server may analyze the sample video image data to determine if one or more should be qualified. In still additional embodiments, the qualifications may be applied if the output of the histogram triggers one or more pre-determined thresholds. Still further configurations may be processed in parallel and utilized to generate multiple histograms and/or attention masks that are all transmitted back to the requesting device which may then decide which one (or more) to utilize.

Once generated, the process 1200 may utilize the histogram data to generate an attention mask (block 1250). The attention mask can be configured in a variety of formats as desired for a particular application. In some embodiments, the mask may consist of a pixel-wise array that consists of a binary (i.e., "on" or "off", "process" or "don't process") output. It is contemplated that other methods of generating attention masks beyond histograms may be utilized as needed.

As discussed above, attention masks may be filtered through one or more shaping filters to better apply the mask. The process 1200 may itself filter the attention mask based on one or more parameters (block 1260). The filtering of the attention mask can be configured to reshape the filter or otherwise make it better applicable to one or more sets of video image data. In some embodiments, the filtering of the attention mask may be accomplished on the requesting device or another intermediate device and/or logic.

Information as herein shown and described in detail is fully capable of attaining the presently described embodiments of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
a processor configured to process video images for object detection by executing a convolutional neural network, the processor being further configured to:
receive video image data comprising a series of images for processing; and
use a pre-generated attention mask to indicate where processing should occur within the series of images, wherein:
the pre-generated attention mask is generated based on a training set of video image data that is processed by a convolutional neural network specialized to output detected object data; and
the video image data is pre-processed with the pre-generated attention mask to generate a series of pre-processed masked images by applying the pre-generated attention mask to the video image data; and
wherein the neural network is configured to:
process the series of pre-processed masked images within areas indicated by the pre-generated attention mask; and
generate an output for the series of pre-processed masked images, the output corresponding to the detection of one or more pre-determined objects within the masked images.

2. The device of claim 1, wherein the detected object data output is a bounding box of the detected object.

3. The device of claim 1, wherein the detected object data output is a pixel-level segmentation of the detected object.

4. The device of claim 1 wherein the specialized convolutional neural network further outputs semantic region segmentation data.

5. The device of claim 1, wherein the detected object data output is utilized to update histogram data relating to the location of the detected objects.

6. The device of claim 5, wherein the histogram data is utilized to generate an attention mask for applying to subsequent video image data.

7. The device of claim 6, wherein the histogram data is a two-dimensional histogram corresponding to the dimensions of the images within the video image data.

8. The device of claim 7, wherein the histogram data is utilized to generate a binary output for each pixel within the images within the video image data.

9. The device of claim 8, wherein the binary output values are generated in relation to a pre-determined threshold value.

10. The device of claim 9, wherein the pre-determined threshold value is dynamically changed based on a semantic segmentation region generated from the specialized convolutional neural network output.

11. The device of claim 1, wherein the generation of the attention mask is performed within an external training server communicatively coupled to the device.

12. The device of claim 1, wherein the received video image data is acquired from a stationary camera, and in response to the movement of the stationary camera, a request for a new attention mask is generated.

13. The device of claim 1, wherein in response to a pre-determined time threshold being exceeded, the device requests the generation of a new attention mask.

14. The device of claim 1, wherein the detection of one or more pre-determined objects within the masked images within the video image data generates a notification that further analysis is required.

15. A method of detecting pre-determined objects within video images, comprising:
configuring a neural network to receive a series of images for object detection;
receiving a sample set of images as video image data;
transferring the received sample set of images to a server configured to generate attention masks by processing the received sample set of images through a convolutional neural network specialized to output detected object data;
receiving a generated attention mask configured for use with the series of images received from a stationary camera;
applying the attention mask to the series of images within the video image data received from the stationary camera to generate a series of masked images; and
processing the masked images within the neural network to generate an output indicating the presence of one or more pre-determined objects.

16. The method of claim 15, wherein the server is a training server, and wherein the transferring to the training server also includes the transmission of configuration data.

17. The method of claim 16, wherein the configuration data includes threshold value derivation parameters.

18. The method of claim 16, wherein the training server is selected based on the type of object selected for detection.

19. A device comprising:
a processor configured to process and detect objects within video images, by executing a neural network and further comprising:
a series of video image data for processing;
an attention mask generated based on a training set of video image data processed by a convolutional neural network specialized to output detected object data, wherein an image tensor of the video image data is pre-processed with the attention mask to generate a series of pre-processed masked images; and
wherein the neural network is configured to process the series of pre-processed masked images and generate an output for the series of masked images, the output corresponding to the detection of one or more objects within the image data.

* * * * *